US012242226B2

(12) United States Patent
Adachi et al.

(10) Patent No.: US 12,242,226 B2
(45) Date of Patent: Mar. 4, 2025

(54) TONER

(71) Applicant: CANON KABUSHIKI KAISHA, Tokyo (JP)

(72) Inventors: Keisuke Adachi, Tokyo (JP); Takayuki Toyoda, Shizuoka (JP); Atsuhiko Ohmori, Kanagawa (JP); Tomoko Sugita, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 510 days.

(21) Appl. No.: 17/660,138

(22) Filed: Apr. 21, 2022

(65) Prior Publication Data

US 2022/0373916 A1 Nov. 24, 2022

(30) Foreign Application Priority Data

Apr. 28, 2021 (JP) ................................ 2021-076275

(51) Int. Cl.
*G03G 9/097* (2006.01)
*G03G 9/08* (2006.01)
*G03G 9/087* (2006.01)

(52) U.S. Cl.
CPC ....... *G03G 9/09716* (2013.01); *G03G 9/0819* (2013.01); *G03G 9/08755* (2013.01); *G03G 9/09725* (2013.01)

(58) Field of Classification Search
CPC ............. G03G 9/09716; G03G 9/0819; G03G 9/08755; G03G 9/09725; G03G 9/08782; G03G 9/08797; G03G 9/09775
See application file for complete search history.

(56) References Cited

U.S. PATENT DOCUMENTS 7,141,342 B2 11/2006 Toyoda et al.
7,147,981 B2 12/2006 Fujikawa
7,264,910 B2 9/2007 Toyoda et al.
7,279,262 B2 10/2007 Fujikawa
7,288,357 B2 10/2007 Toyoda et al.
7,368,211 B2 5/2008 Hasegawa
7,402,368 B2 7/2008 Ogawa
7,422,832 B2 9/2008 Ogawa
7,470,494 B2 12/2008 Nishiyama
7,582,401 B2 9/2009 Ogawa
7,678,524 B2 3/2010 Hasegawa
7,704,659 B2 4/2010 Ogawa
7,811,734 B2 10/2010 Ogawa
7,833,685 B2 11/2010 Tanaka et al.
7,833,687 B2 11/2010 Kato et al.
7,855,042 B2 12/2010 Kobori
7,939,231 B2 5/2011 Ogawa
8,084,174 B2 12/2011 Hasegawa
8,124,306 B2 2/2012 Hirata
8,211,606 B2 7/2012 Murai et al.
8,377,616 B2 2/2013 Tani et al.
8,501,377 B2 8/2013 Takahashi
8,512,925 B2 8/2013 Moribe
8,592,115 B2 11/2013 Kmiecik-Lawrynowicz et al.
8,614,044 B2 12/2013 Matsui et al.
8,628,899 B2 1/2014 Kawamura et al.
8,697,327 B2 4/2014 Shibata et al.
8,815,484 B2 8/2014 Tanaka et al.
8,883,389 B2 11/2014 Matsui et al.
8,916,319 B2 12/2014 Ikeda et al.
8,940,467 B2 1/2015 Hashimoto et al.
9,046,800 B2 6/2015 Hotta
9,097,998 B2 8/2015 Yamazaki
9,128,400 B2 9/2015 Takahashi
9,146,485 B2 9/2015 Tani et al.
9,152,065 B2 10/2015 Sano et al.
9,152,088 B1 10/2015 Kobori
9,158,217 B2 10/2015 Takahashi
9,213,250 B2 12/2015 Nomura et al.
9,213,251 B2 12/2015 Ohmori et al.
9,239,528 B2 1/2016 Hasegawa et al.
(Continued)

FOREIGN PATENT DOCUMENTS

EP 1 403 723 A2 3/2004
EP 2 280 311 A1 2/2011
JP 63-155155 A 6/1988
JP 3-294864 A 12/1991
JP 5-107803 A 4/1993
JP 9-278413 A 10/1997
JP 2002-244338 A 8/2002
JP 2002-365843 A 12/2002
JP 2004-219609 A 8/2004
JP 2007-176747 A 7/2007
JP 2007-178470 A 7/2007
(Continued)

OTHER PUBLICATIONS

U.S. Appl. No. 18/493,903, Ryuji Murayama, filed Oct. 25, 2023.
(Continued)

*Primary Examiner* — Stewart A Fraser
(74) *Attorney, Agent, or Firm* — VENABLE LLP

(57) ABSTRACT

A toner is provided that comprises a toner particle comprising a binder resin and a wax, and an inorganic fine particle on a surface of the toner particle, wherein the binder resin comprises a resin A; the toner satisfies $2.50 \leq SPa - SPw \leq 4.50$, where SPa $(cal/cm^3)^{0.5}$ is the SP value of the resin A, and SPw $(cal/cm^3)^{0.5}$ is the SP value of the wax; the inorganic fine particle comprises a silica fine particle whose surface has been treated with a silicone oil; in a $^{29}Si$ solid-state NMR measurement of the silica fine particle, $30 \leq B \leq 60$ and $4.0 \leq A/B \leq 6.0$ are satisfied, taking A as an integration value of a D unit obtained by taking an integration value of a Q unit in a CP/MAS measurement as 100, and taking B as an integration value of a D unit obtained by taking an integration value of a Q unit in a DD/MAS measurement as 100.

14 Claims, No Drawings

(56) References Cited

U.S. PATENT DOCUMENTS

| | | | |
|---|---|---|---|
| 9,304,422 | B2 | 4/2016 | Matsui et al. |
| 9,348,246 | B2 | 5/2016 | Magome et al. |
| 9,348,253 | B2 | 5/2016 | Kanno |
| 9,354,545 | B2 | 5/2016 | Matsui et al. |
| 9,372,420 | B2 | 6/2016 | Mizo |
| 9,417,540 | B2 | 8/2016 | Hashimoto |
| 9,436,112 | B2 | 9/2016 | Iwasaki |
| 9,442,416 | B2 | 9/2016 | Magome et al. |
| 9,454,094 | B2 | 9/2016 | Tsujimoto |
| 9,556,290 | B2 | 1/2017 | Nishiura et al. |
| 9,606,466 | B2 | 3/2017 | Takahashi |
| 9,651,883 | B2 | 5/2017 | Hama |
| 9,665,021 | B2 | 5/2017 | Ohtsu |
| 9,665,023 | B2 | 5/2017 | Kamae |
| 9,665,026 | B2 | 5/2017 | Iwasaki |
| 9,671,707 | B2 | 6/2017 | Minagawa |
| 9,703,216 | B2 | 7/2017 | Tsuchida |
| 9,715,187 | B2 | 7/2017 | Mukumoto et al. |
| 9,829,814 | B2 | 11/2017 | Yoshida et al. |
| 9,857,711 | B2 | 1/2018 | Yoshida et al. |
| 9,897,934 | B2 | 2/2018 | Tamura |
| 9,915,885 | B2 | 3/2018 | Katsumata |
| 9,964,874 | B2 | 5/2018 | Suzumura et al. |
| 9,969,834 | B2 | 5/2018 | Ohtsu |
| 9,971,263 | B2 | 5/2018 | Fukudome et al. |
| 10,012,918 | B2 | 7/2018 | Ishigami |
| 10,012,920 | B2 | 7/2018 | Shibata |
| 10,012,921 | B2 | 7/2018 | Kamae |
| 10,036,970 | B2 | 7/2018 | Kanno |
| 10,078,281 | B2 | 9/2018 | Ida |
| 10,082,743 | B2 | 9/2018 | Hama |
| 10,088,765 | B2 | 10/2018 | Miyakai |
| 10,133,201 | B2 | 11/2018 | Kamae |
| 10,146,146 | B2 | 12/2018 | Komatsu |
| 10,175,595 | B2 | 1/2019 | Onozaki |
| 10,197,936 | B2 | 2/2019 | Onozaki |
| 10,203,619 | B2 | 2/2019 | Yamashita |
| 10,216,108 | B2 | 2/2019 | Iwasaki |
| 10,228,629 | B2 | 3/2019 | Tamura |
| 10,234,777 | B2 | 3/2019 | Ohtsu |
| 10,241,430 | B2 | 3/2019 | Kimura et al. |
| 10,289,016 | B2 | 5/2019 | Fukudome et al. |
| 10,295,921 | B2 | 5/2019 | Ohmori et al. |
| 10,353,312 | B2 | 7/2019 | Kamae |
| 10,401,748 | B2 | 9/2019 | Hashimoto |
| 10,423,090 | B2 | 9/2019 | Ohtsu |
| 10,451,985 | B2 | 10/2019 | Takahashi |
| 10,451,986 | B2 | 10/2019 | Sano |
| 10,451,990 | B2 | 10/2019 | Kamae |
| 10,474,049 | B2 | 11/2019 | Onozaki |
| 10,514,624 | B2 | 12/2019 | Tamura |
| 10,551,759 | B2 | 2/2020 | Watanabe |
| 10,642,178 | B2 | 5/2020 | Yamashita |
| 10,747,132 | B2 | 8/2020 | Takahashi |
| 10,747,134 | B2 | 8/2020 | Watanabe et al. |
| 10,768,540 | B2 | 9/2020 | Watanabe et al. |
| 10,768,543 | B2 | 9/2020 | Tsujimoto |
| 10,775,710 | B1 | 9/2020 | Kamae |
| 10,838,317 | B2 | 11/2020 | Sugahara |
| 10,859,935 | B2 | 12/2020 | Ohtsu |
| 10,859,936 | B2 | 12/2020 | Sugahara |
| 10,877,386 | B2 | 12/2020 | Murayama |
| 10,877,391 | B2 | 12/2020 | Matsuo |
| 10,935,902 | B2 | 3/2021 | Kanno |
| 10,955,765 | B2 | 3/2021 | Onozaki |
| 10,969,704 | B2 | 4/2021 | Kagawa |
| 11,112,709 | B2 | 9/2021 | Saeki |
| 11,112,713 | B2 | 9/2021 | Akiyama et al. |
| 11,131,938 | B2 | 9/2021 | Murayama |
| 11,181,845 | B2 | 11/2021 | Shimoda et al. |
| 11,249,410 | B2 | 2/2022 | Takahashi |
| 11,249,412 | B2 | 2/2022 | Kawamura et al. |
| 11,415,902 | B2 | 8/2022 | Watanabe |
| 11,429,032 | B2 | 8/2022 | Shibata |
| 11,698,594 | B2 | 7/2023 | Takahashi |
| 11,720,036 | B2 | 8/2023 | Kobori |
| 11,762,307 | B2 | 9/2023 | Tamura |
| 11,796,930 | B2 | 10/2023 | Watanabe |
| 11,809,132 | B2 | 11/2023 | Nagashima |
| 2005/0053858 | A1 | 3/2005 | Yuasa et al. |
| 2008/0299482 | A1 | 12/2008 | Kato et al. |
| 2010/0035171 | A1 | 2/2010 | Watanabe et al. |
| 2010/0273103 | A1 | 10/2010 | Baba et al. |
| 2014/0356779 | A1 | 12/2014 | Hasegawa et al. |
| 2014/0377697 | A1 | 12/2014 | Nishiura et al. |
| 2015/0004539 | A1 | 1/2015 | Watanabe et al. |
| 2015/0037726 | A1* | 2/2015 | Nomura ............. G03G 9/09716 430/109.1 |
| 2015/0086917 | A1 | 3/2015 | Iwasaki et al. |
| 2015/0153667 | A1* | 6/2015 | Noji ................... G03G 9/08755 430/109.3 |
| 2015/0185658 | A1 | 7/2015 | Wakabayashi et al. |
| 2017/0060008 | A1 | 3/2017 | Okuda et al. |
| 2019/0137901 | A1 | 5/2019 | Shimano |
| 2019/0384197 | A1* | 12/2019 | Aoki .................. G03G 9/08711 |
| 2020/0209771 | A1* | 7/2020 | Hashimoto .......... G03G 9/0825 |
| 2020/0341395 | A1 | 10/2020 | Ookubo et al. |
| 2021/0003932 | A1 | 1/2021 | Tsuda et al. |
| 2021/0132519 | A1 | 5/2021 | Hashimoto et al. |
| 2021/0286282 | A1 | 9/2021 | Kobori |
| 2021/0302854 | A1 | 9/2021 | Kitamura |
| 2021/0405549 | A1 | 12/2021 | Ookubo et al. |
| 2022/0050398 | A1 | 2/2022 | Ooyama |
| 2022/0128915 | A1 | 4/2022 | Toyoda et al. |
| 2022/0128919 | A1 | 4/2022 | Kawamura et al. |
| 2022/0146952 | A1 | 5/2022 | Komiya et al. |
| 2022/0146955 | A1 | 5/2022 | Nozaki et al. |
| 2022/0252995 | A1 | 8/2022 | Tsujimoto |
| 2022/0373911 | A1 | 11/2022 | Kamae |
| 2022/0373916 | A1 | 11/2022 | Adachi et al. |
| 2022/0373919 | A1 | 11/2022 | Imura |
| 2023/0037779 | A1 | 2/2023 | Suzumura |
| 2023/0122974 | A1 | 4/2023 | Kagawa |
| 2023/0152725 | A1 | 5/2023 | Ochi |
| 2023/0384702 | A1 | 11/2023 | Adachi |
| 2023/0408940 | A1 | 12/2023 | Matsuo |
| 2023/0408942 | A1 | 12/2023 | Kagawa |
| 2023/0408943 | A1 | 12/2023 | Kitamura |
| 2023/0408944 | A1 | 12/2023 | Tsujimoto |
| 2023/0408945 | A1 | 12/2023 | Shibahara |
| 2023/0408946 | A1 | 12/2023 | Sato |

FOREIGN PATENT DOCUMENTS

| | | | |
|---|---|---|---|
| JP | 2007-293183 | A | 11/2007 |
| JP | 2008-70719 | A | 3/2008 |
| JP | 2008-158394 | A | 7/2008 |
| JP | 2009-116355 | A | 5/2009 |
| JP | 2009-157161 | A | 7/2009 |
| JP | 2009-237525 | A | 10/2009 |
| JP | 2009-292915 | A | 12/2009 |
| JP | 2011-215310 | A | 10/2011 |
| JP | 2015-84095 | A | 4/2015 |
| JP | 2015-172744 | A | 10/2015 |
| JP | 2017-44981 | A | 3/2017 |
| JP | 2018-180146 | A | 11/2018 |
| JP | 2019-86642 | A | 6/2019 |
| JP | 2020-147467 | A | 9/2020 |

OTHER PUBLICATIONS

U.S. Appl. No. 18/418,622, Kosuke Fukudome, filed Jan. 22, 2024.
U.S. Appl. No. 18/418,635, Hiroki Kagawa, filed Jan. 22, 2024.
U.S. Appl. No. 18/418,782, Atsuhiko Ohmori, filed Jan. 22, 2024.
U.S. Appl. No. 17/660,146, Atsuhiko Ohmori, filed Apr. 21, 2022.
U.S. Appl. No. 17/804,879, Hirofumi Kyuushima, filed Jun. 1, 2022.
U.S. Appl. No. 17/804,880, Tomoya Nagaoka, filed Jun. 1, 2022.
U.S. Appl. No. 17/804,882, Naoya Isono, filed Jun. 1, 2022.

(56) References Cited

OTHER PUBLICATIONS

U.S. Appl. No. 17/804,883, Takayuki Toyoda, filed Jun. 1, 2022.
U.S. Appl. No. 17/805,357, Kenji Aoki, filed Jun. 3, 2022.

* cited by examiner

TONER

BACKGROUND OF THE INVENTION

Field of the Invention

The present disclosure relates to a toner that is used in an image forming method such as an electrophotographic method.

Description of the Related Art

Greater power savings have come to be demanded for printers and copiers in recent years. To meet this demand, toners are preferred that melt rapidly at a lower temperature, i.e. that have excellent low-temperature fixability.

With a view to achieving a toner having excellent low-temperature fixability, for instance, Japanese Patent Application Publication Nos. 2015-172744 and 2019-086642 address the use of a wax in toner. The wax is added for the purpose of imparting plasticity to a binder resin. The viscosity of the toner at the time of melting decreases as a result of intermixing of wax, having melted and liquefied on account of heat, with the binder resin and the toner having excellent low-temperature fixability can be obtained.

SUMMARY OF THE INVENTION

Studies by the inventors have revealed that the toner in Japanese Patent Application Publication No. 2015-172744 contains a large amount of wax and that, although excellent in low-temperature fixability, the toner is however problematic in terms of the occurrence of color non-uniformity. Specifically, the binder resin and the wax in the toner particle intermix with each other at the time of fixing; as a result, non-uniform crystallization of the wax occurs after fixing, and color non-uniformity occurs in the fixed image.

In order to improve on the occurrence of color non-uniformity, it is necessary to have the wax crystallize uniformly and rapidly on the surface of the toner particle. The toner according to Japanese Patent Application Publication No. 2019-086642 succeeds in increasing the crystallization rate of the wax through addition of a wax crystal nucleating agent in the form of a crystalline material such that crystal nucleation proceeds rapidly. Although crystallization is promoted, there is however still room for improvement in terms of eliciting uniform crystallization of the wax; moreover, the need to improve on the occurrence of color non-uniformity still remains.

The present disclosure provides a toner having excellent chargeability and improved color non-uniformity of a fixed image, while low-temperature fixability is maintained.

The present disclosure provides a toner comprising a toner particle comprising a binder resin and a wax, and an inorganic fine particle on a surface of the toner particle, wherein the binder resin comprises a resin A;

taking SPa $(cal/cm^3)^{0.5}$ as an SP value of the resin A calculated in accordance with the Fedors method, and taking SPw $(cal/cm^3)^{0.5}$ as an SP value of the wax calculated in accordance with the Fedors method, the SPa and the SPw satisfy Expression (1) below:

$$2.50 \leq SPa - SPw \leq 4.50 \quad (1),$$

the inorganic fine particle comprises a silica fine particle whose surface has been treated with a silicone oil;

in a $^{29}Si$ solid-state NMR measurement of the silica fine particle, taking A as an integration value of a D unit worked out by taking an integration value of a Q unit in a CP/MAS measurement as 100, and taking B as an integration value of a D unit worked out by taking an integration value of a Q unit in a DD/MAS measurement as 100, the A and the B satisfy Expressions (2) and (3) below:

$$30 \leq B \leq 60 \quad (2)$$

$$4.0 \leq A/B \leq 6.0 \quad (3).$$

The present disclosure allows providing a toner having excellent chargeability and improved color non-uniformity of a fixed image, while low-temperature fixability is maintained.

Further features of the present invention will become apparent from the following description of exemplary embodiments.

DESCRIPTION OF THE EMBODIMENTS

Unless otherwise specified, the description of "from XX to YY" or "XX to YY" indicating a numerical range means a numerical range including a lower limit and an upper limit which are end points. When a numerical range is described step by step, the upper and lower limits of each numerical range can be arbitrarily combined.

In order to improve color non-uniformity in a fixed image, as described above, it is necessary to crystallize the wax uniformly and rapidly on the toner particle surface at the time of fixing. In this respect, the inventors surmised that color non-uniformity can be improved upon if the wax can be caused to exude uniformly onto the toner particle surface and can be caused to crystallize rapidly on the toner particle surface at the time of fixing, and arrived at the above toner as a result of assiduous studies on that approach.

The present disclosure relates to a toner comprising a toner particle comprising a binder resin and a wax, and an inorganic fine particle on a surface of the toner particle, wherein the binder resin comprises a resin A;

taking SPa $(cal/cm^3)^{0.5}$ as an SP value of the resin A calculated in accordance with the Fedors method, and taking SPw $(cal/cm^3)^{0.5}$ as an SP value of the wax calculated in accordance with the Fedors method, the SPa and the SPw satisfy Expression (1) below:

$$2.50 \leq SPa - SPw \leq 4.50 \quad (1),$$

the inorganic fine particle comprises a silica fine particle whose surface has been treated with a silicone oil;

in a $^{29}Si$ solid-state NMR measurement of the silica fine particle, taking A as an integration value of a D unit worked out by taking an integration value of a Q unit in a CP/MAS measurement as 100, and taking B as an integration value of a D unit worked out by taking an integration value of a Q unit in a DD/MAS measurement as 100, the A and the B satisfy Expressions (2) and (3) below:

$$30 \leq B \leq 60 \quad (2)$$

$$4.0 \leq A/B \leq 6.0 \quad (3).$$

In these studies, the inventors found that the wax exudes uniformly onto the toner particle surface, during melting and deformation of the toner particle at the time of fixing, through adjustment of a value (SPa−SPw) that results from subtracting the SP value of the wax from the SP value of the resin A, so as to lie in the range from 2.50 to 4.50. In their studies, the inventors also found that the occurrence of color non-uniformity in a fixed image is improved by adjusting the value resulting from subtracting the SP value of the wax from the SP value of the resin A so as to lie in the range from 2.50 to 4.50, and by further adjusting a characteristic of a silica fine particle. The inventors surmise that the reasons for the above are as follows.

Through adjustment of SPa−SPw so as to lie in the above range, the wax having uniformly exuded onto the toner particle surface at the time of fixing adheres rapidly to a silicone oil that is present on the surface of the silica fine particle. This is considered to be because the SP values of the wax and the silicone oil are close to each other, and thus the wax and the silicone oil easily intermixing with each other. Next, wax crystallization proceeds as a result of a drop of the molecular mobility of the wax during cooling after fixing. Herein if the molecular mobility of the silicone oil is high, the molecular mobility of the wax does not decrease readily, and crystallization is prone to be hindered. On the other hand, in a case where the molecular mobility of the silicone oil is low, also the molecular mobility of the wax tends to decrease, and as a result crystallization is readily promoted. Through adjustment of SPa−SPw so as to lie in the above range, therefore, the wax is caused to exude uniformly on the toner particle surface, at the time of fixing, and in consequence the wax adheres readily to the surface of the silicone oil of the silica fine particle. In addition, the inventors speculated that the occurrence of color non-uniformity in the fixed image may be improved by virtue of the fact that the progress of wax crystallization is improved by a specific silicone oil.

As described above, the value of SPa−SPw (the units of the SP values are $(cal/cm^3)^{0.5}$) ranges from 2.50 to 4.50.

In a case where the value of SPa−SPw is lower than 2.50, the wax and the resin A readily intermix with each other at the time of fixing, as a result of which uniform exudation of the wax onto the toner particle surface is readily suppressed, and color non-uniformity occurs. In a case where the value of SPa−SPw exceeds 4.50, the wax and the resin A readily phase-separate at the time of fixing, and the wax becomes readily integrated. As a result, uniform exudation of the wax onto the toner particle surface is readily suppressed, giving rise to color non-uniformity. When the value of SPa−SPw exceeds 4.50, the wax exudes excessively onto the toner particle surface, and chargeability drops. The value of SPa−SPw is preferably from 2.90 to 4.00, more preferably from 3.00 to 3.60.

The resin A is not particularly limited so long as it satisfies the above SP value difference, and for instance, a known resin such as a polyester resin, a vinyl resin, an epoxy resin, a polyurethane resin, a polyamide resin, a cellulose resin, a polyether resin, or a mixed resin or a composite resin of the foregoing, can be used as the resin A. The content of the resin A in the toner particle is 0.5 mass % or higher, and more preferably 3.0 mass % or higher. In a case where the content of the resin Ain the toner particle is within the above range, the wax is likely to exude more uniformly, at the time of fixing, and the occurrence of color non-uniformity can be further improved in combination with the above-described action of the silicone oil. The upper limit of the content of the resin A is not particularly restricted, but is preferably 80.0 mass % or lower.

The resin A is preferably a polyester resin. In a case where the resin A is a polyester resin, the wax tends to exude more uniformly onto the toner particle surface at the time of fixing; accordingly, the occurrence of color non-uniformity can be further improved in combination with the above-described action of the silicone oil.

A saturated polyester resin, an unsaturated polyester resin, or both, can be appropriately selected and used as the polyester resin. Ordinary polyester resins produced from an alcohol component and an acid component can be used as the polyester resin; examples of both these components are listed below. Dihydric alcohol components that can be used in the preparation of the polyester resin include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, cyclohexanedimethanol, butenediol, octenediol, cyclohexene dimethanol, hydrogenated bisphenol A, a bisphenol represented by Formula (E) and derivatives thereof, and diols represented by Formula (F).

Formula (E)

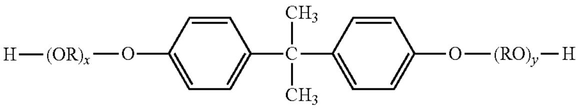

(In Formula (E), R represents an ethylene or propylene group; and x and y are each integers equal to or greater than 0, such that the average value of x+y is 0 to 10.)

Formula (F)

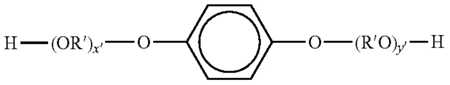

(B1)

$-CH_2CH_2-$ (B2)

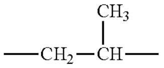

(B3)

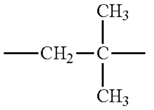

(In Formula (F), R' represents any of Formulas (B1) to (B3); and x' and y' are integers equal to or greater than 0, such that the average value of x'+y' is 0 to 10.)

From the viewpoint of reactivity, for the polyester resin, it is preferable to use a bisphenol of Formula (E) or derivative thereof, or a bisphenol of Formula (E) or derivative thereof with an average value of x+y from 1 to 4.

Examples of trihydric or higher alcohols that can be used to prepare the polyester resin include glycerin, sorbitol, 1,2,3,6-hexanetetrol, 1,4-sorbitan, pentaerythritol, dipentaerythritol, tripentaerythritol, 1,2,4-butanetriol, trimethylolethane, trimethylolpropane and 1,3,5-trihydroxymethylbenzene.

Other alcohol components that can be used to prepare the polyester resin include polyhydric alcohols such as oxyalkylene ethers of novolac-type phenolic resins.

Examples of divalent carboxylic acids that can be used to prepare a polyester resin include dicarboxylic acids and derivatives thereof, for example: benzenedicarboxylic acids and acid anhydrides and lower alkyl esters thereof, such as phthalic acid, terephthalic acid, isophthalic acid and phthalic anhydride; alkyldicarboxylic acids and acid anhydrides and lower alkyl esters thereof, such as succinic acid, adipic acid, sebacic acid and azelaic acid; alkenylsuccinic acids or alkylsuccinic acids, and acid anhydrides and lower alkyl esters thereof, such as n-dodecenylsuccinic acid and n-dodecyl succinic acid; as well as unsaturated dicarboxylic acids and acid anhydrides and lower alkyl esters thereof, such as fumaric acid, maleic acid, citraconic acid and itaconic acid. In the present disclosure, a benzenedicarboxylic acid such as terephthalic acid and isophthalic acid is preferably used from the viewpoint of handleability or reactivity.

Examples of trivalent or higher polyvalent carboxylic acid components that can be used in the preparation of the polyester resin include polyvalent carboxylic acids and derivatives thereof, such as: trimellitic acid, pyromellitic acid, 1,2,4-benzenetricarboxylic acid, 1,2,5-benzenetricarboxylic acid, 2,5,7-naphthalene tricarboxylic acid, 1,2,4-naphthalene tricarboxylic acid, 1,2,4-butanetricarboxylic acid, 1,2,5-hexanetricarboxylic acid, 1,3-dicarboxyl-2-methyl-2-methylenecarboxypropane, tetra(methylenecarboxyl)methane, 1,2,7,8-octanetetracarboxylic acid, Empol trimer acids, as well as acid anhydrides and lower alkyl esters thereof, and tetracarboxylic acids represented by Formula (G), and acid anhydrides and lower alkyl esters thereof. Trimellitic acid is preferably used among the foregoing, in terms of reactivity or ease of adjustment of the acid value of the resin.

Formula (G)

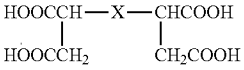

(In Formula (G), X represents an alkylene group or an alkenylene group; Herein X is a substituent having 5 to 30 carbon atoms and having one or more side chains each having 3 or more carbon atoms.)

Other acid components that can be used to prepare the polyester resin include polyvalent carboxylic acids such as 1,2,3,4-butanetetracarboxylic acid and benzophenonetetracarboxylic acid, as well as anhydrides thereof.

The SP value (SPa) of the resin A is preferably from 10.50 to 12.80, more preferably from 11.00 to 12.60, from the viewpoint of chargeability. In a case where SPa lies in the above range, moderate moisture adsorption on the resin A occurs, and chargeability improves readily.

In order to increase SPa, the resin A preferably has monomer units represented by Formula (A) below, in the resin structure. By incorporating a highly hydrophilic unit such as the monomer units represented by Formula (A) into the resin A, the value of SPa increases, and phase separation from the wax can be further improved. In consequence, uniform exudation of the wax onto the toner particle surface is readily promoted at the time of fixing allows as a result to further improve on the occurrence of color non-uniformity in combination with the action of the silicone oil.

The term monomer unit refers to a form resulting from reaction of a monomer substance in a polymer. The content ratio (mass %) of the monomer units represented by Formula (A) in the resin A is preferably 0 mass % or higher, and preferably 20 mass % or lower.

(A)

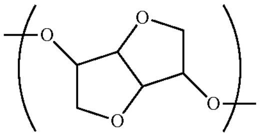

In a case where a polyester resin having monomer units represented by Formula (A) is used as the resin A, the resin may be prepared through condensation of a divalent carboxylic acid or an anhydride thereof, and an isosorbide represented by Formula (H) below. Specifically, the resin can be prepared, for instance, in accordance with a method that involves dehydration condensation at a reaction temperature of 180 to 260° C. in a nitrogen atmosphere with a composition ratio such that there remain carboxy groups.

Formula (H)

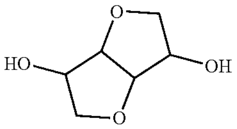

The weight-average molecular weight (Mw) of the resin A is not particularly limited, but is preferably 5000 to 50000, and more preferably 8000 to 20000.

The type of wax is not particularly limited, and the following known materials can be used.

Esters of monohydric alcohols and aliphatic monocarboxylic acids, or esters of monovalent carboxylic acids and aliphatic monoalcohols, such as behenyl behenate, stearyl stearate and palmityl palmitate; esters of dihydric alcohols and aliphatic monocarboxylic acids, or esters of divalent carboxylic acids and aliphatic monoalcohols, such as dibehenyl sebacate and hexanediol dibehenate; esters of trihydric alcohols and aliphatic monocarboxylic acids, or esters of trivalent carboxylic acids and aliphatic monoalchols, such as glyceryl tribehenate; esters of tetrahydric alcohols and aliphatic monocarboxylic acids, or esters of tetravalent carboxylic acids and aliphatic monoalcohols, such as pentaerythritol tetrastearate and pentaerythritol tetrapalmitate; esters of hexahydric alcohols and aliphatic monocarboxylic acids, or esters of hexavalent carboxylic acids and aliphatic monoalcohols, such as dipentaerythritol hexastearate and dipentaerythritol hexapalmitate; esters of polyhydric alcohols and aliphatic monocarboxylic acids, or esters of polyvalent carboxylic acids and aliphatic monoalcohols, such as polyglyceryl behenate; natural ester waxes (hereafter the above are also simply referred to as ester waxes) such as carnauba wax and rice wax; petroleum waxes and derivatives thereof such as paraffin wax, microcrystalline wax and petrolatum; hydrocarbon waxes and derivatives thereof, obtained in accordance with the Fischer-Tropsch method; polyolefin waxes and derivatives thereof (hereafter the above also simply referred to as hydrocarbon waxes) such as polyethylene wax and polypropylene wax; higher aliphatic alcohols; fatty acids such as stearic acid and palmitic acid; acid amide waxes; and low molecular weight crystalline polyesters such as diethylene glycol distearate.

The wax preferably contains at least one selected from the group consisting of the above ester waxes and hydrocarbon waxes; more preferably there is used one of the above ester waxes and hydrocarbon waxes. From the viewpoint of low-temperature fixability and durability, the content of the wax is preferably 3.0 parts by mass to 25.0 parts by mass, more preferably 10.0 parts by mass to 25.0 parts by mass, relative to 100 parts by mass of the binder resin. The SP value of the wax (SPw) is preferably from 7.90 to 9.60, more preferably from 7.90 to 9.20, and yet more preferably from 8.00 to 9.00.

The inorganic fine particle contains a silica fine particle treated on the surface with a silicone oil. That is, the inorganic fine particle contains a silica fine particle, and the silica fine particle is a surface-treated product having undergone a surface treatment with silicone oil. in a $^{29}$Si solid-state NMR measurement of the silica fine particle, taking A as an integration value of a D unit worked out by taking an integration value of a Q unit in a CP/MAS measurement as 100, and taking B as an integration value of a D unit worked out by taking an integration value of a Q unit in a DD/MAS measurement as 100, it is required that the A and the B satisfy Expressions (2) and (3) below:

$$30 \leq B \leq 60 \quad (2)$$

$$4.0 \leq A/B \leq 6.0 \quad (3)$$

Herein A and B in Expressions (2) and (3) are calculated by $^{29}$Si solid-state NMR. In $^{29}$Si solid-state NMR, there can be observed four kind of peaks, namely those of an M unit (Formula (4)), a D unit (Formula (5)), a T unit (Formula (6)) and a Q unit (Formula (7)) relative to all silicon atoms in the solid-state sample.

$$M \text{ unit: } (Ri)(Rj)(Rk)SiO_{1/2} \quad \text{Formula (4)}$$

$$D \text{ unit: } (Rg)(Rh)Si(O_{1/2})_2 \quad \text{Formula (5)}$$

$$T \text{ unit: } RmSi(O_{1/2})_3 \quad \text{Formula (6)}$$

$$Q \text{ unit: } Si(O_{1/2})_4 \quad \text{Formula (7)}$$

(Ri, Rj, Rk, Rg, Rh and Rm in Formulae (4), (5) and (6) are each an alkyl group such as a hydrocarbon group having 1 to 6 carbon atoms, a halogen atom, a hydroxy group, an acetoxy group or an alkoxy group, which is bonded to silicon.)

Two types of measurement methods, namely a DD/MAS measurement method and a CP/MAS measurement method, are used in $^{29}$Si solid-state NMR measurements. In a DD/MAS measurement method, all silicon atoms in the measurement sample are observed, as a result of which there is obtained information on the content of silicon atoms. In a case where the silica fine particles are measured by DD/MAS, the Q unit exhibits a peak derived from the silica fine particles prior to the surface treatment (hereafter also referred to as silica base), and the D unit exhibits a peak derived from the silicone oil which is a surface treatment agent. That is, B in Expression (2), i.e. the integration value of the D unit worked out by taking the integration value of the Q unit as 100, signifies the abundance of silicone oil on the silica fine particles. For instance, the larger the amount of silicone oil that is present on the surface of the silica base, the larger becomes the value of B.

In a CP/MAS measurement, by contrast, a measurement is performed while under magnetization via hydrogen atoms present in the vicinity of silicon atoms, and accordingly the silicon atoms present in the vicinity of hydrogen atoms are observed with high sensitivity. The presence of hydrogen atoms in the vicinity of silicon atoms signifies that the molecular mobility of the measurement sample is low. Specifically, the lower the molecular mobility of the measurement sample and the larger the amount of the sample, the higher is the sensitivity with which silicon atoms are observed. That is, in a case where the silica fine particles are measured by CP/MAS, the value of A in Expression (3), i.e. the integration value of the D unit worked out by taking the integration value of the Q unit as 100, includes information not only on the amount of silicone oil with respect to the silica base, but also on the molecular mobility of the silicone oil. For instance, the greater the presence of silicone oil of low molecular mobility on the surface of the silica base, the larger is the value of A that is observed. Therefore, information on the molecular mobility of the silicone oil that is present on the surface of the silica base can be appropriately obtained by calculating A/B, which is a standard value resulting from dividing A by B. The higher the value of A/B, the lower is the molecular mobility of the silicone oil.

In a case where $30 \leq B$ holds, the silica fine particle is sufficiently surface-treated with the silicone oil, and the chargeability in a high-temperature and high-humidity environment improves because the silicone oil has hydrophobicity. On the other hand, in a case where $B \leq 60$ holds, the silica fine particle is more easily crumbled, and the silica fine particle is readily fixed uniformly to the toner particle at the time of external addition to the toner particle, and therefore chargeability improves. Herein B is preferably from 35 to 55. Further, B can be controlled on the basis of the amount of treatment by silicone oil or the number-average particle diameter of the silica base.

In a case where the A/B is lower than 4.0, the molecular mobility of the silicone oil that is present on the surface of the silica base is high, and accordingly the molecular mobility of the wax does not drop readily, crystallization of the wax is inhibited, and color non-uniformity occurs. On the other hand, in a case where A/B exceeds 6.0, the molecular mobility of the silicone oil becomes too low, and hence the frequency of adhesion of the wax to the silicone oil decreases. As a result, it becomes difficult to reduce the molecular mobility of the wax, crystallization of the wax is inhibited, and color non-uniformity occurs. Herein A/B is preferably from 4.7 to 5.7. Further, A/B can be controlled by modifying the substituents on the side chain and the ends of the silicone oil, or on the basis of the treatment amount of silicone oil.

A known material can be used as the silica base, which is silica fine particle prior to a surface treatment. Examples include fumed silica produced through combustion in an acid hydrogen flame of a silicon compound, in particular a silicon halide, generally silicon chloride, and ordinarily purified silicon tetrachloride; wet silica produced from waterglass; sol-gel-method silica particles obtained in accordance with a wet method; gel-method silica particles; aqueous colloidal silica particles; alcoholic silica particles; fused silica particles obtained in accordance with a vapor phase method; and deflagration-method silica particles.

The inorganic fine particle contains a silica fine particle; the silica fine particle is a surface-treated product in which a silica fine particle before surface treatment is treated on a surface with the silicone oil; the number-average particle diameter of the primary particle of the silica fine particle before surface treatment is preferably from 5 nm to 35 nm, and more preferably from 5 nm to 30 nm. Within the above ranges, high flowability and high chargeability can be sufficiently imparted to the toner. Within the above range, it is also easy to adjust the values of B and A/B.

Examples of the silicone oil (surface treatment agent) include known silicone oils such as dimethyl silicone oil (a polysiloxane with side chains and ends that are all methyl groups), or a modified silicone oil in which the side chains or molecular chain ends of dimethyl silicone oil are substituted with a functional group such as a hydrogen atom, a phenyl group, a carbinol group, a hydroxy group, a carboxyl group or an epoxy group.

The inorganic fine particle contains the silica fine particle; the silica fine particle is a surface-treated product in which a silica fine particle before surface treatment is treated on a surface with the silicone oil; the treatment amount with silicone oil is preferably from 15.0 parts by mass to 40.0 parts by mass, more preferably from 23.0 parts by mass to 35.0 parts by mass, relative to 100 parts by mass of the silica fine particle before surface treatment. In the case of 15.0 parts by mass or more, the silica fine particle is sufficiently surface-treated with the silicone oil and thus chargeability in a high-temperature and high-humidity environment improves because silicone oil is hydrophobic. On the other hand, in a case where the amount is 40.0 parts by mass or less, the silica fine particle is more easily crumbled, and the silica fine particle are readily fixed uniformly to the toner particle at the time of external addition to the toner particle, and chargeability improves readily.

Further, the silicone oil preferably contains a modified silicone oil. In a case where the silicone oil contains a modified silicone oil, the modified silicone oil adheres firmly to the surface of the silica fine particle before surface treatment (i.e. the silica base), as a result of which the molecular mobility of the silicone oil tends to decrease. Therefore, crystallization of the wax starting from the modified silicone oil occurs readily at the time of fixing, which, in combination with the above-described uniform exudation effect of the wax, allows readily improving on the occurrence of color non-uniformity.

Further, the silicone oil preferably contains a modified silicone oil represented by Formula (B). The modified silicone oil is a modified silicone oil having a reactive group at an end (one or both ends) of the molecular chain of dimethyl silicone oil. The modified silicone oil having a reactive group at the end of the molecular chain forms chemical bonds at the end of the molecular chain with silanol groups on the surface of the silica base, as a result of which the molecular mobility of the silicone oil tends to decrease. In consequence, wax crystallization is readily promoted, which, in combination with the above-described uniform exudation effect of the wax, allows readily improving on the occurrence of color non-uniformity.

(B)

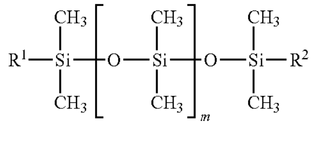

(In the formula, $R^1$ is a carbinol group, a hydroxy group, an epoxy group, a carboxy group, an alkyl group or a hydrogen atom; $R^2$ is a carbinol group, a hydroxy group, an epoxy group, a carboxy group or a hydrogen atom; m is an integer from 30 to 200 (more preferably from 40 to 100); and each alkyl group in a side chain of Formula (B) is optionally substituted with a carbinol group, a hydroxy group, an epoxy group, a carboxy group or a hydrogen atom.)

The silicone oil preferably contains a modified silicone oil represented by Formula (C). The modified silicone oil represented by Formula (C) is a modified silicone oil having hydroxy groups at both ends of the molecular chain. The hydroxy groups present at the ends of the molecular chain of the modified silicone oil form strong siloxane bonds with silanol groups on the surface of the silica base, as a result of which the molecular mobility of the silicone oil tends to decrease. Therefore, crystallization of the wax proceeds readily, which, in combination with the above-described uniform exudation effect of the wax, allows readily improving on the occurrence of color non-uniformity.

(C)

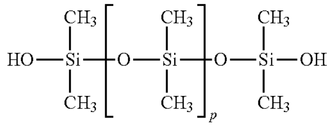

(In the formula, p is an integer of 30 to 200 (more preferably 40 to 100).)

Further, the silicone oil preferably further contains polydimethylsiloxane represented by Formula (D) below. The silica fine particle is sufficiently hydrophobized and chargeability readily improves, when the silicone oil contains the polydimethylsiloxane represented by Formula (D) and the above modified silicone oil. The above values of B and A/B are also readily adjusted so as to lie within the above range. The treatment amount by the polydimethylsiloxane represented by Formula (D) is preferably from 12.0 parts by mass to 35.0 parts by mass, more preferably from 12.0 parts by mass to 27.0 parts by mass, relative to 100 parts by mass of the silica fine particle before surface treatment.

(D)

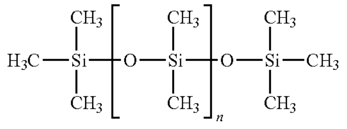

(In the formula, n is an integer of 30 to 200 (more preferably 40 to 100).)

The treatment amount with the modified silicone oil is preferably from 0.2 parts by mass to 15.0 parts by mass, more preferably from 1.0 parts by mass to 13.0 parts by mass, relative to 100 parts by mass of the silica fine particle before surface treatment. The above values of B and A/B are readily adjusted within the above respective ranges by prescribing the treatment amount to lie within the above corresponding ranges. The content of the silica fine particle treated on the surface with a silicone oil is preferably from 0.2 parts by mass to 15.0 parts by mass, more preferably from 0.5 parts by mass to 13.0 parts by mass, relative to 100 parts by mass of the toner particle.

The surface treatment of the silica base with silicone oil can be performed in accordance with a known wet method or dry method. By using these methods, it becomes possible to perform a surface treatment in a state where the silica base is dispersed so that the aggregation diameter of the silica fine particles is a mechanically appropriate one. In the surface treatment with silicone oil, the above silicone oil may be used singly or in the form of a plurality of types. In a case where multiple types are used, there may be executed a treatment step 1 with a first treatment agent, in which the silica base is treated with a first silicone oil, followed by treatment step 2 with a second treatment agent, in which the silica base is treated with a second silicone oil. Adjustment of the values of B and A/B above so as to lie the above ranges can be accomplished more precisely if there are multiple treatment steps.

Known resins can be used as the binder resin. For instance, there can be used homopolymers of styrene and substitution products thereof, such as polystyrene and polyvinyltoluene; styrene-based copolymers such as styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-dimethylaminoethyl acrylate copolymers, styrene-methyl methacrylate copolymers, styrene-ethyl methacrylate copolymers, styrene-butyl methacrylate copolymers, styrene-dimethylaminoethyl methacrylate copolymers, styrene-vinyl methyl ether copolymers, styrene-vinyl ethyl ether copolymers, styrene-vinyl methyl ketone copolymers, styrene-butadiene copolymers, styrene-isoprene copolymers, styrene-maleic acid copolymers and styrene-maleate ester copolymers; as well as polymethyl methacrylate, polybutyl methacrylate, polyvinyl acetate, polyethylene, polypropylene, polyvinyl butyral, silicone resins, polyester resins, polyamide resins, epoxy resins and polyacrylic acid resins; the foregoing can be used singly or in combinations of a plurality of types. Particularly preferred among the foregoing are styrene acrylic resins typified by styrene-butyl acrylate and polyester resins, for instance in terms of developing characteristics and fixability.

Examples of polymerizable monomers that make up the above styrene acrylic resins include the following. Examples styrenic polymerizable monomers include styrene; α-methylstyrene, o-methylstyrene, m-methylstyrene, p-methylstyrene and p-methoxystyrene.

Examples of acrylic polymerizable monomers include acrylic polymerizable monomers such as methyl acrylate, ethyl acrylate, n-propyl acrylate, iso-propyl acrylate, n-butyl acrylate, iso-butyl acrylate, tert-butyl acrylate, n-hexyl acrylate, 2-ethylhexyl acrylate, n-octyl acrylate and cyclohexyl acrylate.

Examples of methacrylic polymerizable monomers include methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-hexyl methacrylate, 2-ethylhexyl methacrylate and n-octyl methacrylate. The method for producing the styrene acrylic resin is not particularly limited, and a known method can be resorted to.

Examples of polymerizable monomers that form the above polyester resin include those listed below. Examples of the polyester resins include condensation polymers of a polyvalent carboxylic acid and a polyhydric alcohol. A commercially available product, or a synthesized product, may be used herein as the polyester resin.

Examples of polyvalent carboxylic acids include aliphatic dicarboxylic acids (for instance, oxalic acid, malonic acid, maleic acid, fumaric acid, citraconic acid, itaconic acid, glutaconic acid, succinic acid, alkenylsuccinic acids, adipic acid and sebacic acid), alicyclic dicarboxylic acids (for instance, cyclohexanedicarboxylic acid), aromatic dicarboxylic acids (for instance, terephthalic acid, isophthalic acid, phthalic acid and naphthalene dicarboxylic acid), as well as anhydrides and lower alkyl esters (having for instance from 1 to 5 carbon atoms) of the foregoing. Preferred polyvalent carboxylic acids among the above are for instance aromatic dicarboxylic acids.

A trivalent or higher carboxylic acid having a crosslinked structure or a branched structure may be used, concomitantly with a dicarboxylic acid, as the above polyvalent carboxylic acid. Examples of the trivalent or higher carboxylic acid include trimellitic acid, pyromellitic acid, as well as anhydrides thereof and lower alkyl esters thereof (having for instance 1 to 5 carbon atoms). The polyvalent carboxylic acid may be used singly or concomitantly in the form of two or more types.

Examples of polyhydric alcohols include aliphatic diols (for instance, ethylene glycol, diethylene glycol, triethylene glycol, propylene glycol, butanediol, hexanediol and neopentyl glycol), alicyclic diols (for instance, cyclohexanediol, cyclohexanedimethanol and hydrogenated bisphenol A), aromatic diols (for instance, ethylene oxide adducts of bisphenol A and propylene oxide adducts of bisphenol A). Preferred polyhydric alcohols among the foregoing include aromatic diols and alicyclic diols, more preferably aromatic diols.

As the polyhydric alcohol there can be used a trihydric or higher polyhydric alcohol having a crosslinked structure or a branched structure, concomitantly with a diol. Examples of trihydric or higher polyhydric alcohols include glycerin, trimethylolpropane and pentaerythritol. The polyhydric alcohol may be used singly or concomitantly in the form of two or more types. The method for producing the polyester resin is not particularly limited and a known method can be resorted to. The binder resin can also be used in combination with other known resins.

The toner particle may further contain a colorant. Examples of the colorant include the following organic pigments, organic dyes and inorganic pigments. Examples of yellow pigments include monoazo compounds, disazo compounds, condensed azo compounds, isoindolinone compounds, isoindoline compounds, benzimidazolone compounds, anthraquinone compounds, azo metal complexes, methine compounds and allylamide compounds. Specific examples include C. I. Pigment Yellow 74, 93, 95, 109, 111, 128, 155, 174, 180 and 185.

Examples of magenta pigments include monoazo compounds, condensed azo compounds, diketopyrrolopyrrole compounds, anthraquinone compounds, quinacridone compounds, basic dye lake compounds, naphthol compounds, benzimidazolone compounds, thioindigo compounds and perylene compounds. Specifically, C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221, 238, 254, 269 and C. I. Pigment Bio Red 19.

Examples of cyan pigments include copper phthalocyanine compounds and derivatives thereof, anthraquinone compounds and basic dye lake compounds. Specifically, C. I. Pigment Blue 1, 7, 15, 15:1, 15:2, 15:3, 15:4, 60, 62 and 66.

Examples of black pigments include carbon black, aniline black, non-magnetic ferrite and magnetite. Pigments resulting from color matching to black using the above yellow pigments, magenta pigments and cyan pigments may also be used.

The toner of the present disclosure can be made into a magnetic toner by having a magnetic body incorporated thereinto. In this case, the magnetic body can also serve as a colorant. Examples of magnetic bodies include iron oxides typified by magnetite, hematite and ferrite; and metals such as iron, aluminum, copper, magnesium, tin, zinc, antimony, beryllium, bismuth, cadmium, calcium, manganese, selenium, titanium, tungsten and vanadium, as well as alloys and mixtures of the foregoing.

These pigments may be subjected to a hydrophobic treatment in accordance with a known method. Further, these pigments can be used singly, or mixed with each other, and also in a solid solution state. Various dyes conventionally known as colorants may be used along with the pigments. The content of the pigment is preferably from 1.0 parts by mass to 20.0 parts by mass, relative to 100.0 parts by mass of the binder resin.

The toner particle may further contain a charge control agent. A conventionally known charge control agent can be used without particular limitations as the charge control agent. Charge control agents include negative charge control agents that control toner to negatively charged and positive charge control agent that control toner to positively charged. Specific examples of negative charge control agents include metal complexes of aromatic carboxylic acids typified by salicylic acid, alkylsalicylic acids, dialkylsalicylic acids, naphthoic acid and dicarboxylic acids; polymers or copolymers having a sulfonic acid group, a sulfonic acid base or a sulfonic acid ester group; metal salts or metal complexes of azo dyes or azo pigments; as well as boron compounds, silicon compounds and calixarenes. Examples of positive charge control agents include quaternary ammonium salts, polymer compounds having a quaternary ammonium salt in a side chain, guanidine compounds, nigrosin-based compounds and imidazole compounds. Examples of polymers and copolymers having a sulfonic acid group, a sulfonic acid base or a sulfonic acid ester group include homopolymers of sulfonic acid group-containing vinylic monomers, typified by styrenesulfonic acid, 2-acrylamide-2-methylpropanesulfonic acid, 2-methacrylamide-2-methylpropanesulfonic acid, vinylsulfonic acid and methacrylic sulfonic acid; and copolymers of the foregoing sulfonic acid group-containing vinylic monomers and the vinylic monomers exemplified in the section on the binder resin. The addition amount of the charge control agent is preferably from 0.01 parts by mass to 20.0 parts by mass relative to 100.0 parts by mass of the binder resin.

In addition to the silica fine particle described above, the following inorganic fine particle may be used concomitantly as the inorganic fine particle. Titanium oxide, carbon black and carbon fluoride, metal oxides (for instance, strontium titanate, cerium oxide, alumina, magnesium oxide and chromium oxide); nitrides (for instance, silicon nitride), metal salts (for instance, calcium sulfate, barium sulfate, calcium carbonate); as well as metal salts of fatty acids (for instance, zinc stearate and calcium stearate). The inorganic fine particle can also be subjected to a hydrophobic treatment in order to improve the flowability of the toner and in order to render uniform the charge of the toner particle. Besides, the modified silicone oil described above, examples of treatment agents for a hydrophobic treatment of the inorganic fine particle include unmodified silicone varnishes, various modified silicone varnishes, unmodified silicone oil, silane compounds, silane coupling agents and other organosilicon compounds and organotitanium compounds. These treatment agents may be used singly, or may be used concomitantly with each other. The content of the inorganic fine particle is preferably from 0.2 parts by mass to 15.0 parts by mass, more preferably from 0.5 parts by mass to 13.0 parts by mass, relative to 100 parts by mass of the toner particle.

The toner particle may be produced in accordance with either a dry production method (for instance, a kneading pulverization method), a wet production method (for instance, an emulsion aggregation method or a suspension polymerization method method). In the case of production in accordance with a kneading pulverization method, for instance, the binder resin containing the resin A and the wax, and as needed, materials such as a colorant and a charge control agent, are thoroughly mixed in a mixer such as a Henschel mixer or a ball mill. Thereafter, the toner material may be dispersed or melted through melt-kneading using a heat kneader such as a heating roll, a kneader or an extruder, is then solidified through cooling, pulverized, and thereafter classified, and, as needed, subjected to a surface treatment, to thereby yield a toner particle. The order of classification and surface treatment may be either prior to the other. Preferably, a multi-grade classifier is used in the classification step, in terms of production efficiency.

In the emulsion aggregation method, an aqueous dispersion of fine particles made up of the constituent materials of the toner particle, sufficiently small for the target particle diameter, is prepared in advance, and the fine particles are aggregated in an aqueous medium until a given toner particle diameter is reached, whereupon the resin is caused to undergo melt adhesion, through heating, to thereby produce a toner.

Specifically, in the emulsion aggregation method a toner particle is produced as a result of a dispersion step of producing a fine particle dispersion made up of the constituent materials of the toner particle, an aggregation step of aggregating the fine particles made up of the constituent materials of the toner particle and controlling the particle diameter until the toner particle diameter is reached, a fusion step of eliciting melt adhesion in the resin included in the obtained aggregated particles, and a subsequent cooling step.

The suspension polymerization method involves uniformly dissolving or dispersing a polymerizable monomer, a binder resin including the resin A, and a wax (and also a colorant, a polymerization initiator, a crosslinking agent, a charge control agent and other additives, as needed), to yield a polymerizable monomer composition. Thereafter, the polymerizable monomer composition is dispersed in a continuous phase (for instance, an aqueous phase) containing a dispersing agent, using an appropriate stirrer, while a polymerization reaction is conducted simultaneously, to yield a toner particle having a desired particle diameter. Each individual toner particle obtained in accordance with this suspension polymerization method (hereafter also referred to as "polymerized toner particle") uniformly has a substantially spherical toner particle shape; accordingly, the distribution of charging amount is relatively uniform and improvements in image quality can be expected as a result.

Examples of the polymerizable monomer that makes up the polymerizable monomer composition in the production of the polymerized toner particle include the following: styrenic monomers such as styrene, o-methyl styrene, m-methyl styrene, p-methyl styrene, p-methoxy styrene and p-ethyl styrene; acrylic acid esters such as methyl acrylate, ethyl acrylate, n-butyl acrylate, isobutyl acrylate, n-propyl acrylate, n-octyl acrylate, dodecyl acrylate, 2-ethylhexyl acrylate, stearyl acrylate, 2-chlorethyl acrylate and phenyl acrylate; methacrylic acid esters such as methyl methacrylate, ethyl methacrylate, n-propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; and other monomers such as acrylonitrile, methacrylonitrile and acrylamide. These monomers may be used singly or in mixtures thereof. Styrene on its own, or in mixture with other monomers, is preferably used among the above monomers, from the viewpoint of the developing characteristic and durability of the toner.

The polymerization initiator used in the above production by suspension polymerization method preferably has a half-life of 0.5 to 30 hours at the time of the polymerization reaction. When carrying out the polymerization reaction using an addition amount of 0.5 to 20 parts by mass of polymerization initiator relative to 100 parts by mass of the polymerizable monomer, a polymer is obtained that exhibits a maximum value of molecular weight between 5,000 and 50,000, and the toner particle is imparted with desirable strength and appropriate melting characteristics.

Examples of the polymerization initiator include the following: azo or diazo polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like; peroxide polymerization initiators such as benzoyl peroxide, methyl ethyl ketone peroxide, diisopropyl peroxycarbonate, cumene hydroperoxide, 2,4-dichlorobenzoyl peroxide, lauroyl peroxide, t-butyl peroxy-2-ethylhexanoate, t-butyl peroxypivalate, and the like.

A crosslinking agent may be added to produce the toner particle by suspension polymerization method. The viscosity of the toner particle at 120° C. can be increased by addition of a crosslinking agent. A preferred additive amount of the crosslinking agent is 0.001 to 15 parts by mass relative to 100 parts by mass of the polymerizable monomer.

Examples of the crosslinking agent include mainly compounds having two or more polymerizable double bonds, for instance, aromatic divinyl compounds such as divinylbenzene and divinylnaphthalene; carboxylic acid esters having two double bonds, such as ethylene glycol diacrylate, ethylene glycol dimethacrylate and 1,3-butanediol dimethacrylate; divinyl compounds such as divinylaniline, divinyl ether, divinyl sulfide and divinylsulfone; and compounds having three or more vinyl groups. The foregoing may be used singly or as a mixture of two or more types.

To produce the toner particle by suspension polymerization method, generally the above toner composition and other compositions are added as appropriate, with uniform dissolution or dispersion using a disperser such as a homogenizer, a ball mill or an ultrasonic disperser, to yield a polymerizable monomer composition that is then suspended in an aqueous medium that contains a dispersing agent. The particle diameter of the obtained toner particle is made sharper by bringing about the desired toner particle diameter in one go, through the use of a high-speed disperser such as a high-speed stirrer or ultrasonic disperser. In terms of the timing of addition of the polymerization initiator, the polymerization initiator may be added simultaneously with addition of the other additives to the polymerizable monomer, or may be mixed in immediately prior to suspension in the aqueous medium. There may also be added a polymerization initiator dissolved in the polymerizable monomer or in the solvent, immediately after granulation, or prior to the start to the polymerization reaction. After granulation, a particulate state may be maintained through the use of an ordinary stirrer, such that it suffices that the particles be stirred so as to prevent floating and settling of the particles.

A known surfactant or organic dispersing agent/inorganic dispersing agent may be used as a dispersing agent to produce the toner particle. Inorganic dispersing agents can be preferably used among the foregoing, since inorganic dispersing agents are not prone to generate harmful ultrafine powders, while the steric hindrance of inorganic dispersing agents affords dispersion stability; as a result, the stability of the dispersing agent is lost less readily even when the reaction temperature is changed, and also the dispersing agent can be washed off readily, while not being prone to adversely affect the toner particle. Examples of inorganic dispersing agents include inorganic compounds, for instance, polyvalent metal salts of phosphoric acid such as tricalcium phosphate, magnesium phosphate, aluminum phosphate, zinc phosphate and hydroxyapatite; carbonates such as calcium carbonate and magnesium carbonate; inorganic salts such as calcium metasilicate, calcium sulfate and barium sulfate; as well as inorganic compounds such as calcium hydroxide, magnesium hydroxide and aluminum hydroxide.

Preferably, the inorganic dispersing agent is used in an amount of 0.2 parts by mass to 20 parts by mass relative to 100 parts by mass of the polymerizable monomer. The above dispersing agents may be used singly; alternatively, two or more types thereof may be used concomitantly. Further, 0.001 parts by mass to 0.1 parts by mass of a surfactant may be used concomitantly.

In a case where such an inorganic dispersing agent is utilized, the dispersing agent may be used as-is, or may be used through generation of particles of the inorganic dispersing agent in an aqueous medium in order to obtain finer particles. For instance, in case where tricalcium phosphate is used, a water-insoluble calcium phosphate can be produced, and a finer and more uniform dispersion can be obtained, by mixing an aqueous solution of sodium phosphate and an aqueous solution of calcium chloride under high-speed stirring. Although a water-soluble sodium chloride salt is generated herein as a byproduct, the presence of a water-soluble salt in the aqueous medium is nevertheless more convenient, since in that case dissolution of the polymerizable monomer in water is inhibited, and ultrafine particles of toner resulting from emulsion polymerization are unlikelier to be generated.

Examples of the surfactant include sodium dodecylbenzene sulfate, sodium tetradecylsulfate, sodium pentadecylsulfate, sodium octylsulfate, sodium oleate, sodium laurate, sodium stearate and potassium stearate.

In a step of polymerizing the polymerizable monomer, the polymerization temperature is set at 40° C. or higher, generally 50 to 90° C.

The toner particle is obtained through filtration, washing and drying in accordance with known methods of the obtained polymer particles. The toner of the present disclosure can be obtained through external addition and mixing of inorganic fine particles containing silica fine particles having been surface-treated with a silicone oil, to the toner particle, to thereby elicit adhesion to the surface of the toner particle. Further, a classification step may be included in the production process (prior to mixing of the inorganic fine powder) to remove a coarse powder or a fine powder in the toner particle.

A known method can be resorted to as the above mixing method. Herein a Henschel mixer is an instance of a device that can be suitably used.

Methods for measuring physical properties of the toner of the present disclosure will be described next.

Measurement of the Melting Point of the Wax

The melting point of the wax is measured according to ASTM D3418-82 using a differential scanning calorimeter Q2000. The temperature at the detection unit of the instrument is corrected on the basis of the melting points of indium and zinc, and the amount of heat is corrected on the basis of the heat of fusion of indium. Specifically, 1.0 mg of the wax is weighed exactly, and is placed on a pan made of aluminum, using an empty aluminum-made pan as a reference, a measurement is then carried out within a measurement temperature range of 30 to 200° C., at a ramp rate of 10° C./min. In the measurement, the sample is heated once to 200° C. at a ramp rate of 10° C./min, is next cooled down to 30° C. at a ramp down rate of 10° C./min, and is thereafter heated once more. A peak temperature (units: ° C.) of the maximum endothermic peak of the DSC curve in the temperature range of 30 to 200° C. in the course of this second heating is taken as the melting point of the wax in the DSC measurement.

Measurement of the Weight-Average Particle Diameter (D4) and Number-Average Particle Diameter (D1) of the Toner (Particle) or Silica Base The weight average particle diameter (D4) and the number average particle diameter (D1) of the toner (or the toner particle) are measured at the number of effective measurement channels of 25,000 by using a precision particle size distribution measuring device "Coulter Counter Multisizer 3" (registered trademark, manufactured by Beckman-Coulter Inc.) which is based on the pore electrical resistivity method and equipped with a 100-μm aperture tube and dedicated software "Beckman Coulter Multisizer 3 Version 3.51" (produced by Beckman-Coulter Inc.) for setting measurement conditions and analyzing measurement data, the measurement data is analyzed and calculations are performed. An electrolytic aqueous solution to be used for the measurement can be prepared by dissolving special grade sodium chloride in ion-exchanged water so that the concentration becomes about 1% by mass. For example, "ISOTON II" (manufactured by Beckman-Coulter Inc.) can be used. Before performing the measurement and analysis, the dedicated software is set as follows.

On a "Change standard measurement method (SOM) screen" of the dedicated software, the total count number in the control mode is set to 50000 particles, the number of measurement cycles to 1, and a Kd value to a value obtained using "standard particles 10.0 μm" (manufactured by Beckman-Coulter Inc.). By pressing a threshold/noise level measurement button, the threshold and noise level are automatically set. Further, the current is set to 1600 μA, the gain to 2, and the electrolyte solution to ISOTON II, and the flush of the aperture tube after measurement is checked. On the "Pulse to particle diameter conversion setting screen" of the dedicated software, a bin spacing is set to a logarithmic particle diameter, a particle diameter bin to 256 particle diameter bin, and the particle diameter range from 2 μm to 60 μm. The specific measurement method is as follows.

(1) About 200 ml of the electrolytic aqueous solution is put in a glass 250 ml round bottom beaker provided with the Multisizer 3, the beaker is set on the sample stand, and counterclockwise stirring with the stirrer rod is performed at 24 revolutions/sec. Then, dirt and air bubbles in the aperture tube are removed by the "Flush of the aperture tube" function of the dedicated software.

(2) About 30 ml of the electrolytic aqueous solution is placed in a 100 ml flat-bottomed beaker made of glass, and about 0.3 ml of a diluted solution prepared by threefold mass dilution of "Contaminone N" (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) with ion-exchanged water is added as a dispersant thereto.

(3) A predetermined amount of ion-exchanged water is put in a water tank of an ultrasonic disperser "Ultrasonic Dispersion System Tetora 150" (manufactured by Nikkaki Bios Co., Ltd.) in which two oscillators with an oscillation frequency of 50 kHz are built in with a phase shifted by 180 degrees and which has an electrical output of 120 W, and about 2 ml of the Contaminone N is added to the water tank.

(4) The beaker of (2) is set into a fixing hole of the ultrasonic disperser, and the ultrasonic disperser is operated. The height position of the beaker is adjusted so that the resonance state of the liquid level of the electrolytic solution in the beaker is maximized.

(5) With the electrolytic aqueous solution in the beaker of (4) irradiated with ultrasonic waves, about 10 mg of toner (or toner particle) is added little by little to the electrolytic aqueous solution and dispersed. Then, the ultrasonic dispersion processing is continued for another 60 sec. In the ultrasonic dispersion, the water temperature in the water tank is adjusted, as appropriate, to be from 10° C. to 40° C.

(6) The electrolytic aqueous solution of (5) in which the toner was dispersed is added dropwise by using a pipette to the round-bottomed beaker of (1) that was installed in the sample stand, and the measurement concentration is adjusted to about 5%. Then, the measurement is performed until the number of measured particles reaches 50,000.

(7) The measurement data are analyzed with the dedicated software provided with the device, and the weight average particle diameter (D4) or the number average particle diameter (D1) are calculated. The "arithmetic diameter" on the analysis/volume statistics (arithmetic mean) screen when graph/volume % is set with the dedicated software is the weight average particle diameter (D4). The "arithmetic diameter" on the analysis/number statistics (arithmetic mean) screen when graph/number % is set with the dedicated software are the number average particle diameter (D1).

Method for Measuring the Molecular Weights of the Wax and the Resin A

The molecular weights of the wax and the resin A are measured by gel permeation chromatography (GPC), as follows.

First, the sample is dissolved in tetrahydrofuran (THF) at room temperature. Then, the obtained solution is filtered with a solvent-resistant membrane filter "Maeshori Disc" (manufactured by Tosoh Corporation) having a pore diameter of 0.2 μm to obtain a sample solution. The sample solution is adjusted so that the concentration of the component soluble in THE is 0.8% by mass. This sample solution is used for measurement under the following conditions.

Equipment: high-speed GPC device "HLC-8220GPC" (manufactured by Tosoh Corporation)

Column: LF-604, double

Eluent: THF

Flow rate: 0.6 ml/min

Oven temperature: 40° C.

Sample injection amount: 0.020 ml

To calculate the molecular weight of each sample, there is used a molecular weight calibration curve created using a standard polystyrene resin (product name "TSK STANDARD POLYSTYRENE F-850, F-450, F-288, F-128, F-80, F-40, F-20, F-10, F-4, F-2, F-1, A-5000, A-2500, A-1000 or A-500", by Tosoh Corporation).

Method for Measuring SP Values

The SP values used in the invention are calculated on the basis of the types and ratios of the monomers that make up the respective resin, in accordance with the commonly used Fedors method. Evaporation energy (Δei) (cal/mol) and molar volume (Δvi) ($cm^3$/mol) are worked out on the basis of the tables given in "Polym. Eng. Sci., 14 (2), 147-154 (1974)", where $(\Sigma\Delta ei/\epsilon\Delta vi)^{0.5}$ is taken as the SP value $(cal/cm^3)^{0.5}$. The SP value can be controlled on the basis of the type and amount of the monomers. For instance, a monomer of large SP value may be used in order to increase the SP value. Conversely, a monomer of low SP value may be used in order to reduce the SP value.

Method for Calculating B and A/B by $^{29}$Si Solid-State NMR Measurement of Silica Fine Particles A $^{29}$Si solid-state NMR measurement of silica fine particles is performed after separating the silica fine particles from the toner surface. A method for separating silica fine particles from the toner surface and a $^{29}$Si solid-state NMR measurement method will be described next.

Method for Separating Silica Fine Particles from the Toner Surface

When silica fine particles separated from the surface of the toner are used as the measurement sample, the silica fine particles are separated from the toner by the following procedure.

A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in in a centrifuge tube to prepare a dispersion liquid. To this dispersion liquid, 1 g of toner is added, and toner lumps are loosened with a spatula or the like.

The centrifuge tube is set in "KM Shaker" (model: V.SX) manufactured by Iwaki Sangyo Co., Ltd., and the tube is shaken for 20 min under the condition of 350 reciprocations per min. After shaking, the solution is transferred to a glass tube (50 mL) for a swing rotor, and centrifugation is performed at 3500 rpm for 30 min with a centrifuge.

In the glass tube after centrifugation, toner particles are present in the uppermost layer, and silica fine particles are present on the aqueous solution side of the lower layer. The aqueous solution of the lower layer is collected, and centrifugation is repeated as necessary, and after sufficient separation, the dispersion liquid is dried and silica fine particles are collected.

Next, a $^{29}$Si solid-state NMR measurement of the silica fine particles recovered from the toner particle is carried out under measurement conditions as illustrated below.

Measurement Conditions of $^{29}$Si-NMR (Solid-State)

DD/MAS measurement conditions for solid-state $^{29}$Si-NMR (solid-state) are as follows.

Device: JNM-ECX5002 (JEOL RESONANCE Co., Ltd.)
Temperature: room temperature
Measurement method: DD/MAS method, $^{29}$Si, 45°
Sample tube: zirconia 3.2 mmφ
Sample: filled in a test tube, in a powder state
Sample rotational speed: 10 kHz
Relaxation delay: 180 s
Scan count: 2000 scans CP/MAS measurement conditions for solid-state $^{29}$Si-NMR (solid-state) are as follows.

Device: JNM-ECX5002 (JEOL RESONANCE Co., Ltd.)
Temperature: Room temperature
Measurement method: CP/MAS method, $^{29}$Si, 45°
Sample tube: zirconia 3.2 mmφ
Sample: filled in a test tube, in a powder state
Sample rotation speed: 10 kHz
Relaxation delay: 5 s
Scan count: 15000 scans After the above measurement, multiple silane components of the silica fine particles, having different substituents and different bonded groups, are subjected to peak separation by curve fitting into an M unit, a D unit, a T unit and a Q unit described below.

$M$ unit: $(Ri)(Rj)(Rk)SiO_{1/2}$ Formula (4)

$D$ unit: $(Rg)(Rh)Si(O_{1/2})_2$ Formula (5)

$T$ unit: $RmSi(O_{1/2})_3$ Formula (6)

$Q$ unit: $Si(O_{1/2})_4$ Formula (7)

(In Formulae (4), (5) and (6), Ri, Rj, Rk, Rg, Rh and Rm each represents an alkyl group such as a hydrocarbon group having 1 to 6 carbon atoms, a halogen atom, a hydroxy group, an acetoxy group or an alkoxy group, bonded to a silicon atom.)

After peak separation, the values of B and A/B are calculated, where A is the integration value of the D unit worked out by taking the integration value of the Q unit in the CP/MAS measurement as 100, and B is the integration value of the D unit worked out by taking the integration value of the Q unit in the DD/MAS measurement as 100.

EXAMPLES

The present disclosure will be described in more detail next with reference to production examples and examples, but these examples are not meant to limit the present disclosure in any way. As used in the examples, the language "parts" refers to parts by mass in all instances.

Production of a Magnetic Body

Production of Magnetic Iron Oxide

Into a ferrous sulfate aqueous solution, there were mixed a caustic soda solution of 1.00 to 1.10 equivalents relative to iron, $P_2O_5$ in an amount of 0.15 mass % on a phosphorus basis relative to iron, and $SiO_2$ in an amount of 0.50 mass % on a silicon basis relative to iron, to prepare an aqueous solution containing ferrous hydroxide. The pH of the aqueous solution was set to 8.0 and an oxidation reaction was carried out at 85° C. while air was blown into the aqueous solution to prepare a slurry liquid having seed crystals.

Next, to this slurry liquid, a ferrous sulfate aqueous solution was added in an amount of 0.90 to 1.20 equivalents relative to the initial alkali amount (sodium component of caustic soda), after which the slurry liquid was maintained at pH 7.6 and an oxidation reaction was carried out while under blowing of air to yield a slurry liquid containing magnetic iron oxide.

Production of a Silane Compound

Herein 30 parts of iso-butyltrimethoxysilane were added dropwise to 70 parts of ion-exchanged water while under stirring. Thereafter, the resulting aqueous solution was maintained at pH 9.0 and at a temperature of 45° C., and was dispersed at a peripheral speed of 0.46 m/s for 120 minutes using a disper blade, to conduct hydrolysis and a condensation reaction. After adjustment of the pH of the aqueous solution to 9.0, the aqueous solution was immediately cooled down to 10° C. to discontinue hydrolysis and the condensation reactions. An aqueous solution containing a silane compound was obtained in this manner.

Production of a Magnetic Body

Then the above-described solution that contained 4.7 parts of silane compound relative to 100 parts of the above-described magnetic iron oxide was added to the slurry liquid containing the magnetic iron oxide, while dispersing the whole using a pin mill. At that time, the pH was maintained at 9.0 and the temperature was maintained at 55° C., and the product was dispersed for 60 minutes, to cause a hydrophobic treatment of the magnetic body to proceed. The above dispersion was then filtered using a filter press, and was washed with a large amount of water. Further, the particles obtained upon drying for 2 hours at 120° C. were crumbled and caused to pass through a sieve having a 100 μm mesh opening, to yield a magnetic body having a number-average particle diameter of 230 nm.

Production of Silica Fine Particle 1

Herein 100 parts of fumed silica (silica base; spherical, by Evonik Japan Co., Ltd.) having a number-average particle diameter as given in Table (1) were placed in a reaction vessel, and a solution resulting from diluting, while under stirring and nitrogen purging, 15 parts of the Treatment agent 1 (average repetition unit n=60) given in Table (1) in 100 parts of hexane was added; the whole was then stirred for 120 minutes at 300° C. The obtained silica fine particles were then crumbled using a pin-type deaglommeration device to yield Silica fine particle 1.

Production of Silica Fine Particles 2-8 and 11

Silica fine particles 2-8 and 11 were produced in the same way as Silica fine particle 1, except that Treatment agent 1 and Treatment agent 2 the number of parts shown in Table (1) were used relative to 100 parts of fumed silica having a number-average particle diameter as given in Table (1).

Production of Silica Fine Particles 9 and 10

Silica fine particles 9 and 10 were produced in the same way as the Silica fine particle 1, except that Treatment agent 1 of the type and the number of parts shown in Table (1) were used relative to 100 parts of fumed silica having a number-average particle diameter as given in Table (1).

In the table, $R^1$ and $R^2$ of Treatment agents 1 and 2 respectively denote $R^1$ and $R^2$ in the modified silicone oil represented by Formula (B). The number of parts of Treatment agents 1 and 2 is herein the number of treatment parts of the treatment agents 1 and 2 with respect to 100 parts of the silica base (i.e. the silica fine particle prior to the surface treatment). The value of n of Treatment agents 1 and 2 denote the numerical value of m in the modified silicone oil represented by Formula (B).

Production of Resin A1

A total of 100 parts of a mixture in which raw material monomers other than trimellitic anhydride were mixed in the charging amounts shown in Table 2 and 0.52 parts of tin di(2-ethylhexanoate) as a catalyst were placed in a polymerization tank equipped with a nitrogen introduction line, a dewatering line, and a stirrer. Next, after converting the atmosphere inside the polymerization tank into a nitrogen atmosphere, a polycondensation reaction was carried out over 6 h while heating at 200° C. Further, after raising the temperature to 210° C., trimellitic anhydride was added, the pressure inside the polymerization tank was reduced to 40 kPa, and then a condensation reaction was further carried out. Table 2 shows the acid value, weight average molecular weight (Mw) and SP value (Spa) of the obtained resin. This resin was referred to as Resin A1.

Production of Resins A2 to A10

Resins A2 to A10 were produced by performing the same operations as for Resin A1, with the input amounts of the starting monomers as given in Table 2 below. Sequential sampling and measurement were then performed, and the polymerization reaction was stopped once the desired molecular weight was reached, whereupon the product was retrieved from the polymerization tank. The physical characteristics of the obtained resins are given in Table 2 below. A propylene oxide 3-mole adduct of bisphenol A and an ethylene oxide 2-mole adduct of bisphenol A were used as BPA in a molar ratio of 45.0 to 44.2 in the production of Resin A9. A propylene oxide 3-mole adduct of bisphenol A and an ethylene oxide 2-mole adduct of bisphenol A were used as BPA in a molar ratio of 29.8 to 33.0 in the production of Resin A10. A propylene oxide 3-mole adduct of bisphenol A was used in a case where no BPA was designated.

TABLE 1

| Silica fine particle No. | Number-average particle diameter D1 (nm) | Treatment agent 1 Type $R^1$ | $R^2$ | n | Number of parts | Treatment agent 2 Type $R^1$ | $R^2$ | n | Number of parts | $^{29}$Si-NMR B | A/B |
|---|---|---|---|---|---|---|---|---|---|---|---|
| 1 | 7 | hydroxy group | hydroxy group | 60 | 15 parts | — | — | — | — | 30 | 6.0 |
| 2 | 14 | methyl group | methyl group | 60 | 35 parts | hydroxy group | hydroxy group | 60 | 5 parts | 60 | 4.2 |
| 3 | 14 | methyl group | methyl group | 60 | 18 parts | hydroxy group | methyl group | 60 | 7 parts | 41 | 4.8 |
| 4 | 32 | methyl group | methyl group | 60 | 19 parts | epoxy group | methyl group | 60 | 6 parts | 35 | 4.5 |
| 5 | 7 | methyl group | methyl group | 60 | 24 parts | carbinol group | carbinol group | 60 | 10 parts | 53 | 4.9 |
| 6 | 32 | methyl group | methyl group | 60 | 19 parts | carboxy group | carboxy group | 60 | 1 part | 37 | 4.0 |
| 7 | 7 | methyl group | methyl group | 60 | 14 parts | hydroxy group | hydroxy group | 60 | 10 parts | 40 | 5.3 |
| 8 | 7 | hydroxy group | hydroxy group | 60 | 8 parts | methyl group | methyl group | 60 | 14 parts | 38 | 4.6 |
| 9 | 14 | methyl group | methyl group | 60 | 30 parts | — | — | — | — | 47 | 2.5 |
| 10 | 14 | hydroxy group | hydroxy group | 60 | 13 parts | — | — | — | — | 27 | 6.4 |
| 11 | 14 | hydroxy group | hydroxy group | 60 | 2 parts | methyl group | methyl group | 60 | 40 parts | 65 | 3.9 |

TABLE 2

| | | | Resin A1 | Resin A2 | Resin A3 | Resin A4 | Resin A5 | Resin A6 | Resin A7 | Resin A8 | Resin A9 | Resin A10 |
|---|---|---|---|---|---|---|---|---|---|---|---|---|
| Resin composition (mass %) | Acid | TPA | 39.6 | 26.8 | 28.5 | 22.5 | 28.0 | 26.6 | 18.2 | 30.5 | 16.9 | 18.3 |
| | | IPA | 0.0 | 14.6 | 15.4 | 22.5 | 15.7 | 14.5 | 27.4 | 16.5 | 16.6 | 17.8 |
| | | TMA | 0.3 | 0.0 | 1.6 | 8.7 | 6.1 | 0.0 | 5.3 | 1.7 | 0.6 | 0.6 |
| | Alcohol | BPA | 52.8 | 52.6 | 29.4 | 41.9 | 22.0 | 53.0 | 47.8 | 24.3 | 59.3 | 50.0 |
| | | EG | 5.8 | 5.9 | 1.3 | 4.5 | 1.3 | 5.9 | 1.4 | 1.4 | 0.0 | 0.0 |
| | | Isosorbide | 1.5 | 0.1 | 23.9 | 0.0 | 26.9 | 0.0 | 0.0 | 25.6 | 6.6 | 13.2 |
| Resin properties | Isosorbide | | 1.5 | 0.1 | 23.9 | 0.0 | 26.9 | 0.0 | 0.0 | 25.6 | 6.6 | 13.2 |
| | Acid value | | 2.5 | 2.0 | 5.1 | 18.9 | 13.8 | 2.0 | 12.3 | 5.3 | 3.1 | 3.2 |
| | Weight-average molecular weight Mw | | 12100 | 10800 | 9700 | 11000 | 10800 | 12300 | 9800 | 10000 | 12000 | 12300 |
| | SP value | | 11.68 | 11.69 | 12.39 | 10.93 | 12.71 | 11.67 | 11.13 | 12.60 | 11.21 | 11.47 |

In the table, the isosorbide item in the resin physical properties denotes the content ratio (mass %), in the resin A, of the monomer units resulting from polymerization of the isosorbide represented by Formula (A).

The abbreviations in the table are as follows,

TPA: terephthalic acid

IPA: isophthalic acid

TMA: trimellitic anhydride

BPA: propylene oxide adducts or ethylene oxide adducts of bisphenol A (details as described above)

EG: ethylene glycol

Waxes 1-7

The waxes listed in Table 3 below were used herein. Table 3 below sets out the SP values (SPw) and melting points of Waxes 1 to 7.

TABLE 3

| | Material name | SP value | Melting point (° C.) |
|---|---|---|---|
| Wax 1 | Behenyl stearate | 8.60 | 68.0 |
| Wax 2 | Dipentaerythritol hexamyristate | 9.07 | 68.0 |
| Wax 3 | Polyolefin wax | 8.01 | 72.0 |
| Wax 4 | Ethylene glycol distearate | 8.85 | 65.0 |
| Wax 5 | Fischer-Tropsch wax | 8.11 | 78.0 |
| Wax 6 | Dibehenyl sebacate | 8.77 | 73.3 |
| Wax 7 | Paraffin wax HNP9 | 8.11 | 75.0 |

Production of Toner Particle 1

Herein 850 parts of a 0.1 mol/L $Na_3PO_4$ aqueous solution were added to a container equipped with a high-speed stirrer CLEARMIX (by M Technique Co. Ltd.), and the solution was heated to 60° C. while under stirring at a rotational peripheral speed of 33 m/s. Then 68 parts of a 1.0 mol/L $CaCl_2$) aqueous solution were added thereto, to prepare an aqueous media containing a small amount of a slightly water-soluble dispersing agent $Ca_3(PO_4)_2$.

In addition, a solution was prepared by mixing and dissolving the following materials using a propeller-type stirrer. To mix the materials below, the rotational speed of the stirrer was set to 100 r/min.

Styrene: 75.0 parts n-butyl acrylate: 25.0 parts

Resin A1: 13.0 parts

Magnetic body: 90.0 parts

Wax 1: 18.0 parts

Iron complex of monoazo dye (T-77: by Hodogaya Chemical Co., Ltd.): 1.0 part 1,6-hexanediol diacrylate: 0.5 parts Thereafter, the mixed solution was heated to a temperature of 60° C., and was stirred using a TK homomixer (by Primix Corporation (formerly Tokushu Kika Kogyo Co., Ltd.)) with the rotational speed of the stirrer set to 9000 r/min, to dissolve and disperse the solid fraction.

Then 10.0 parts of tert-butylperoxyisopropyl monocarbonate (by NOF Corporation, product name: Perbutyl I), which is a polymerization initiator, were added and dissolved in the mixed solution, to prepare a polymerizable monomer composition. Next, the polymerizable monomer composition was added to the above aqueous medium, and the whole was heated to a temperature of 60° C., followed by granulation for 15 minutes while CLEARMIX was caused to rotate at a rotational peripheral speed of 33 m/s.

Thereafter, the product was transferred to a propeller-type stirrer and was caused to react at a temperature of 70° C. for 5 hours while under stirring at 100 rpm/min, followed by warming up to a temperature of 85° C. and further reaction for 4 hours, to produce a magnetic toner particle. Once the polymerization reaction was over, the suspension was cooled down to room temperature. After cooling, hydrochloric acid was added to lower the pH to 2.0 or less, and thereby dissolve the inorganic fine particle. After repeated washing with water several times, the product was dried at 40° C. for 72 hours using a dryer, followed by classification using a multi-grade classifier relying on the Coanda effect, to thereby produce Toner particle 1.

Production of Toner Particles 2 to 14, 16, 17, 19 to 23 and 25 to 28

Toner particles 2 to 14, 16, 17, 19 to 23 and 25 to 28 were produced in the same way as in the method for producing Toner particle 1, except that there were used the materials and the number of parts given in Table 4.

Production of Toner Particle 15

Herein 2.3 parts of tricalcium phosphate were added to 900 parts of ion-exchanged water heated to 60° C., with stirring at 10,000 rpm using T. K. Homomixer (by Tokushu Kika Kogyo Co., Ltd.), to yield an aqueous medium.

The following materials were uniformly dissolved and mixed at 100 r/min in a propeller-type stirrer to prepare a resin-containing monomer.

Styrene 45.0 parts n-butyl acrylate 25.0 parts

Resin A9 4.0 parts 1,6-hexanediol diacrylate: 0.5 parts

The following materials were dispersed using an attritor (by Mitsui Miike Engineering Corporation) to yield a monomer containing a fine granular colorant.

Styrene 30.0 parts

C.I. Pigment blue 15:3 7.4 parts

Charge control agent (Bontron E-88 (by Orient Chemical Industries Co., Ltd.)) 1.0 part Wax 7: Paraffin wax HNP9 (by Nippon Seiro Co., Ltd.) 5.0 parts Next, the monomer containing a fine granular colorant and the resin-containing monomer above were uniformly mixed to yield a polymerizable monomer composition; thereafter, the polymerizable monomer composition was heated to 60° C. Next, the polymerizable monomer composition was added to into the aqueous medium, and the whole was stirred at 10000 rpm using T. K. Homomixer (by Tokushu Kika Kogyo Co., Ltd.), to yield particles of the polymerizable monomer composition. Then 10.0 parts of tert-butyl peroxypivalate, which was a polymerization initiator, were added thereto, and granulation was continued for 10 minutes.

Thereafter, the product was transferred to a propeller type stirrer and was caused to react at a temperature of 75° C. for 5 hours while under stirring at 100 rpm/min, followed by warming up to a temperature of 85° C. and further reaction for 5 hours. Once the polymerization reaction was over, the product was cooled down to room temperature (25° C.), hydrochloric acid was added to dissolve the calcium phosphate salt, and the product was filtered and washed with water, to yield wet colored particles. The wet colored particles were dried at a temperature of 40° C. for 72 hours, to yield Toner particle 15.

Production of Toner Particle 18

Preparation of a Resin Particle Dispersion

Preparation of Resin Particle Dispersion (1)

Terephthalic acid: 30 parts

Fumaric acid: 70 parts

Ethylene oxide 2-mole adduct of bisphenol A: 5 parts

Propylene oxide 3-mole adduct of bisphenol A: 95 parts

The above materials were charged in a 5 L flask equipped with a stirrer, a nitrogen introduction tube, a temperature sensor and a rectification column, and the temperature was raised up to 210° C. over 1 hour, whereupon 1 part of titanium tetraethoxyde was charged relative to 100 parts of the above materials. The temperature was raised up to 230° C. over 0.5 hours while the generated water was distilled off, and the dehydration condensation reaction was continued at that temperature for 1 hour, followed by cooling of the reaction product. A polyester resin having a weight-average molecular weight of 18,500, an acid value of 14 mgKOH/g, and a glass transition temperature of 59° C. was synthesized in this manner.

Then 40 parts of ethyl acetate and 25 parts of 2-butanol were added to a container equipped with a temperature regulation means and a nitrogen replacement means, to prepare a mixed solvent, after which 100 parts of the above polyester resin were gradually added to and dissolved in the mixed solvent, followed by addition of a 10 mass % ammonia aqueous solution (3 times the equivalent, in molar ratio, of the acid value of the resin), with stirring for 30 minutes.

Next, the interior of the container was replaced with dry nitrogen, the temperature was maintained at 40° C., and 400 parts of ion-exchanged water were added dropwise at a rate of 2 parts/min while under stirring of the mixed solution, to elicit emulsification. After dropwise addition was over, the emulsion was reverted to room temperature (20° C. to 25° C.), and was bubbled with dry nitrogen for 48 hours while under stirring, to thereby to reduce the amount of ethyl acetate and 2-butanol down to 1,000 ppm or less, and obtain a resin particle dispersion having dispersed therein resin particles having a volume-average particle diameter of 200 nm. Ion-exchanged water was added to the resin particle dispersion, to adjust the amount of the solids to 20 mass %, and yield Resin particle dispersion (1).

Preparation of Resin Particle Dispersion (2)

Resin particle dispersion (2) was obtained as in the preparation of Resin particle dispersion 1, except that herein Resin A1 was used instead of a polyester resin.

Preparation of a Colorant Particle Dispersion

Preparation of a Colorant Particle Dispersion

Cyan pigment, C. I. Pigment Blue 15:3 (copper phthalocyanine, by DIC Corporation, product name: FASTOGEN BLUE LA5380): 70 parts Anionic surfactant (by Dai-ichi Kogyo Seiyaku Co., Ltd., Neogen RK): 5 parts Ion-exchanged water: 200 parts The above materials were mixed and dispersed for 10 minutes using a homogenizer (Ultra-Turrax T50 by IKA-Werke GmbH & Co. KG). Ion-exchanged water was added so that the amount of the solids in the dispersion were 20 mass %, to yield a colorant particle dispersion (1) having dispersed therein colorant particles having a volume-average particle diameter of 190 nm.

Preparation of a Release Agent Particle Dispersion

Preparation of Release Agent Particle Dispersion (1)

Wax 1: 100 parts

Anionic surfactant (by Dai-ichi Kogyo Seiyaku Co., Ltd., Neogen RK): 1 part

Ion-exchanged water: 350 parts

The above materials were mixed, heated to 100° C., dispersed using a homogenizer (Ultra-Turrax T50 by IKA-Werke GmbH & Co. KG), and thereafter dispersed using a Manton-Gaulin high-pressure homogenizer (by SPX Flow Technology Systems, Inc.), to obtain a release agent particle dispersion (the amount of solids of 20 mass %) having dispersed therein release agent particles having a volume-average particle diameter of 200 nm.

Production of a Toner Particle

Preparation of Toner Particle (1)

An apparatus was prepared in which a round stainless steel flask and a container A were connected to each other by way of a tube pump A, a liquid held in the container A was fed to a flask through driving of the tube pump A, the container A and a container B were connected to each other by way of a tube pump B, and the liquid held in the container B was fed to the container A through driving of the tube pump B. The following operations were carried out using this apparatus.

Resin particle dispersion (1): 500 parts

Colorant particle dispersion (1): 40 parts

Anionic surfactant (Tayca Power, brand, BN2070M, sodium dodecylbenzene sulfonate): 2 parts The above materials were placed in a round stainless steel flask, and 0.1 N nitric acid was added to adjust the pH to 3.5, followed by addition of 30 parts of a nitric acid aqueous solution having a polyaluminum chloride concentration of 10 mass %. Next, the whole was dispersed at 30° C. using a homogenizer (Ultra-Turrax T50 by IKA-Werke GmbH & Co. KG), after which the particle diameter of aggregated particles was allowed to grow while the temperature was raised at a rate of 1° C./30 minute, in an oil bath for heating.

Meanwhile, 50 parts of Resin particle dispersion (2) were placed in the container A in the form of a polyester bottle, and 25 parts of Release agent particle dispersion (1) were similarly placed in the container B. Next, the liquid feeding rate of the tube pump A was set to 0.70 parts/min and the liquid feeding rate of the tube pump B was set to 0.14 parts/min, whereupon the tube pumps A and B were driven, from the point in time at which the temperature within the round stainless steel flask during formation of the aggregated particles reached 37.0° C., to initiate feeding of the respective dispersions. The mixed dispersion having resin particles and release agent particles dispersed therein was fed as a result from the container A to the round stainless steel flask during formation of the aggregated particles, while the concentration of the release agent particles was increased gradually.

Upon completion of liquid feeding of the dispersions into the flask, the temperature was maintained for 30 minutes from the point in time at which the temperature within the flask reached 48° C., to elicit formation of second aggregated particles.

Thereafter, 50 parts of the resin particle dispersion (2) were slowly added, with holding for 1 hour, and then a 0.1 N sodium hydroxide aqueous solution was added, to adjust the pH to 8.5, followed by heating up to 85° C. while under continued stirring, and subsequent holding for 5 hours. The whole was thereafter cooled down to 20° C. at a rate of 20° C./min.

The above dispersion was filtered, thoroughly washed with ion-exchanged water, and dried, to yield Toner particle 18.

Production of Toner Particle 24

Herein 850 parts of a 0.1 mol/L $Na_3PO_4$ aqueous solution were added to a container equipped with a high-speed stirrer CLEARMIX (by M Technique Co. Ltd.), and the solution was heated to 60° C. while under stirring at a rotational peripheral speed of 33 m/s. Then 68 parts of a 1.0 mol/L $CaCl_2$) aqueous solution was added thereto, to prepare an aqueous medium containing a small amount of a slightly water-soluble dispersing agent $Ca_3(PO_4)_2$. A solution was then prepared by mixing and dissolving the following materials using a propeller-type stirrer. To mix the materials below, the rotational speed of the stirrer was set to 100 r/min.

Styrene: 75.0 parts
n-butyl acrylate: 25.0 parts
Magnetic body: 90.0 parts
Wax 3: 18.0 parts
Iron complex of monoazo dye (T-77: by Hodogaya Chemical Co., Ltd.): 1.0 part
1,6-hexanediol diacrylate: 0.5 parts Thereafter, the resulting mixed solution was heated to a temperature of 60° C., and was stirred using a TK homomixer (by Primix Corporation (formerly Tokushu Kika Kogyo Co., Ltd.)), with the rotational speed of the stirrer set to 9000 r/min, to dissolve and disperse the solid fraction.

A polymerizable monomer composition was then prepared by adding 10.0 parts of tert-butyl peroxypivalate, which is a polymerization initiator, and dissolving the tert-butyl peroxypivalate in the mixed solution. Next, this polymerizable monomer composition was added to the aqueous medium above, and the whole was heated to a temperature of 60° C., followed by granulation for 15 minutes while CLEARMIX was caused to rotate at a rotational peripheral speed of 33 m/s.

Thereafter, the product was transferred to a propeller type stirrer and was caused to react at a temperature of 70° C. for 5 hours while under stirring at 100 rpm, followed by warming up to a temperature of 85° C. and further reaction for 4 hours, to produce a magnetic toner particle. Once the polymerization reaction was over, the suspension was cooled down to room temperature. After cooling, hydrochloric acid was added to lower the pH to 2.0 or less, and dissolve thereby the inorganic fine particles. After repeated washing with water several times, the product was dried at 40° C. for 72 hours using a dryer, followed by classification using a multi-grade classifier relying on the Coanda effect, to thereby produce Toner particle 24. Table 4 sets out the physical properties of each toner particle.

TABLE 4

| Toner | Production conditions | | | | | | Properties | |
|---|---|---|---|---|---|---|---|---|
| | Resin A | | Wax | | | | | |
| particle No. | Type | Number of parts | Type | Number of parts | 1,6-hexanediol diacrylate | Colorant | SPa-SPw | D4 (μm) |
| 1 | Resin A1 | 13.0 parts | Wax 1 | 18 parts | 0.5 | Magnetic body | 3.08 | 7.1 |
| 2 | Resin A1 | 13.0 parts | Wax 2 | 18 parts | 0.3 | Magnetic body | 2.61 | 7.3 |
| 3 | Resin A1 | 13.0 parts | Wax 7 | 18 parts | 0.5 | Magnetic body | 3.57 | 7.1 |
| 4 | Resin A8 | 13.0 parts | Wax 6 | 18 parts | 0.6 | Magnetic body | 3.83 | 7.1 |
| 5 | Resin A3 | 13.0 parts | Wax 3 | 18 parts | 0.5 | Magnetic body | 4.38 | 7 |
| 6 | Resin A8 | 13.0 parts | Wax 5 | 18 parts | 0.7 | Magnetic body | 4.49 | 7.2 |
| 7 | Resin A1 | 2.4 parts | Wax 1 | 18 parts | 0.8 | Magnetic body | 3.08 | 7.1 |
| 8 | Resin A2 | 7.4 parts | Wax 1 | 18 parts | 0.8 | Magnetic body | 3.09 | 7.1 |
| 9 | Resin A1 | 42.0 parts | Wax 1 | 18 parts | 0.7 | Magnetic body | 3.08 | 7.1 |
| 10 | Resin A1 | 240.0 parts | Wax 1 | 18 parts | 0.6 | Magnetic body | 3.08 | 7.1 |
| 11 | Resin A1 | 560.0 parts | Wax 1 | 18 parts | 0.5 | Magnetic body | 3.08 | 7.4 |
| 12 | Resin A4 | 13.0 parts | Wax 3 | 18 parts | 0.5 | Magnetic body | 2.92 | 7.1 |
| 13 | Resin A7 | 13.0 parts | Wax 5 | 18 parts | 0.5 | Magnetic body | 3.02 | 7.1 |
| 14 | Resin A6 | 13.0 parts | Wax 5 | 18 parts | 0.6 | Magnetic body | 3.56 | 7.1 |
| 15 | Resin A9 | 4.0 parts | Wax 7 | 18 parts | 0.5 | C.I. Pigment Blue 15:3 | 3.10 | 7.1 |
| 16 | Resin A10 | 13.0 parts | Wax 5 | 18 parts | 0.8 | Magnetic body | 3.36 | 7.2 |
| 17 | Resin A5 | 13.0 parts | Wax 1 | 18 parts | 0.8 | Magnetic body | 4.11 | 7.1 |
| 18 | Resin A1 | 20.0 parts | Wax 1 | 18 parts | — | C.I. Pigment Blue 15:3 | 3.08 | 7.1 |
| 19 | Resin A4 | 13.0 parts | Wax 2 | 18 parts | 0.5 | Magnetic body | 1.86 | 7.4 |
| 20 | Resin A4 | 13.0 parts | Wax 4 | 18 parts | 0.5 | Magnetic body | 2.08 | 7.1 |
| 21 | Resin A9 | 13.0 parts | Wax 2 | 18 parts | 0.5 | Magnetic body | 2.14 | 7.1 |
| 22 | Resin A9 | 13.0 parts | Wax 6 | 18 parts | 0.5 | Magnetic body | 2.44 | 7.1 |
| 23 | Resin A5 | 13.0 parts | Wax 3 | 18 parts | 0.5 | Magnetic body | 4.70 | 7.3 |
| 24 | — | — | Wax 3 | 18 parts | 0.5 | Magnetic body | — | 7.7 |
| 25 | Resin A1 | 13.0 parts | Wax 1 | 12 parts | 0.5 | Magnetic body | 3.08 | 7.1 |

TABLE 4-continued

| Toner particle No. | Production conditions: Resin A Type | Resin A Number of parts | Wax Type | Wax Number of parts | 1,6-hexanediol diacrylate | Colorant | Properties: SPa-SPw | D4 (μm) |
|---|---|---|---|---|---|---|---|---|
| 26 | Resin A1 | 13.0 parts | Wax 1 | 15 parts | 0.5 | Magnetic body | 3.08 | 7.2 |
| 27 | Resin A1 | 13.0 parts | Wax 1 | 21 parts | 0.5 | Magnetic body | 3.08 | 7.2 |
| 28 | Resin A1 | 13.0 parts | Wax 1 | 25 parts | 0.5 | Magnetic body | 3.08 | 7.3 |

Production of Toner 1

Toner particle 1 (100.0 parts) and Silica fine particle 7 (1.0 parts) were externally mixed using FM10C (by Nippon Coke & Engineering Co., Ltd.).

The external addition conditions included the input amount of the toner particle of 1.8 kg, rotational speed of 3600 rpm, and external addition time of 30 minutes. Thereafter Toner 1 was obtained through sifting using a mesh having a mesh opening of 200 μm.

Production of Toners 2 to 25 and Comparative Toners 1 to 10 Toners 2 to 25 and Comparative toners 1 to 10 were obtained in accordance with the same method as in the production of Toner 1, except that the toner particle and the silica fine particle were modified as given in the table below.

TABLE 5

| | Material: Toner particle | Material: Silica fine particle | Properties: SPa-SPw | Resin A content (mass %) | B | A/B |
|---|---|---|---|---|---|---|
| Toner 1 | Toner particle 1 | Silica fine particle 7 | 3.08 | 5.6 | 40 | 5.3 |
| Toner 2 | Toner particle 1 | Silica fine particle 1 | 3.08 | 5.6 | 30 | 6.0 |
| Toner 3 | Toner particle 1 | Silica fine particle 2 | 3.08 | 5.6 | 60 | 4.2 |
| Toner 4 | Toner particle 1 | Silica fine particle 6 | 3.08 | 5.6 | 37 | 4.0 |
| Toner 5 | Toner particle 2 | Silica fine particle 7 | 2.61 | 5.6 | 40 | 5.3 |
| Toner 6 | Toner particle 3 | Silica fine particle 7 | 3.57 | 5.6 | 40 | 5.3 |
| Toner 7 | Toner particle 4 | Silica fine particle 7 | 3.83 | 5.6 | 40 | 5.3 |
| Toner 8 | Toner particle 5 | Silica fine particle 7 | 4.38 | 5.6 | 40 | 5.3 |
| Toner 9 | Toner particle 6 | Silica fine particle 7 | 4.49 | 5.6 | 40 | 5.3 |
| Toner 10 | Toner particle 7 | Silica fine particle 7 | 3.08 | 1.1 | 40 | 5.3 |
| Toner 11 | Toner particle 8 | Silica fine particle 7 | 3.09 | 3.3 | 40 | 5.3 |
| Toner 12 | Toner particle 9 | Silica fine particle 7 | 3.08 | 16.1 | 40 | 5.3 |
| Toner 13 | Toner particle 10 | Silica fine particle 7 | 3.08 | 52.2 | 40 | 5.3 |
| Toner 14 | Toner particle 11 | Silica fine particle 7 | 3.08 | 71.8 | 40 | 5.3 |
| Toner 15 | Toner particle 12 | Silica fine particle 7 | 2.92 | 5.6 | 40 | 5.3 |
| Toner 16 | Toner particle 13 | Silica fine particle 7 | 3.02 | 5.6 | 40 | 5.3 |
| Toner 17 | Toner particle 14 | Silica fine particle 7 | 3.56 | 5.6 | 40 | 5.3 |
| Toner 18 | Toner particle 15 | Silica fine particle 7 | 3.10 | 3.1 | 40 | 5.3 |
| Toner 19 | Toner particle 16 | Silica fine particle 7 | 3.36 | 5.6 | 40 | 5.3 |
| Toner 20 | Toner particle 17 | Silica fine particle 7 | 4.11 | 5.6 | 40 | 5.3 |
| Toner 21 | Toner particle 25 | Silica fine particle 3 | 3.08 | 5.7 | 41 | 4.8 |
| Toner 22 | Toner particle 26 | Silica fine particle 4 | 3.08 | 5.7 | 35 | 4.5 |
| Toner 23 | Toner particle 27 | Silica fine particle 5 | 3.08 | 5.5 | 53 | 4.9 |
| Toner 24 | Toner particle 28 | Silica fine particle 8 | 3.08 | 5.4 | 38 | 4.6 |
| Toner 25 | Toner particle 18 | Silica fine particle 7 | 3.08 | 14.5 | 40 | 5.3 |
| Comparative toner 1 | Toner particle 1 | Silica fine particle 9 | 3.08 | 5.6 | 47 | 2.5 |
| Comparative toner 2 | Toner particle 1 | Silica fine particle 10 | 3.08 | 5.6 | 27 | 6.4 |
| Comparative toner 3 | Toner particle 1 | Silica fine particle 11 | 3.08 | 5.6 | 65 | 3.9 |
| Comparative toner 4 | Toner particle 19 | Silica fine particle 8 | 1.86 | 5.6 | 38 | 4.6 |
| Comparative toner 5 | Toner particle 20 | Silica fine particle 8 | 2.08 | 5.6 | 38 | 4.6 |
| Comparative toner 6 | Toner particle 21 | Silica fine particle 8 | 2.14 | 5.6 | 38 | 4.6 |
| Comparative toner 7 | Toner particle 22 | Silica fine particle 8 | 2.44 | 5.6 | 38 | 4.6 |
| Comparative toner 8 | Toner particle 23 | Silica fine particle 8 | 4.70 | 5.6 | 38 | 4.6 |
| Comparative toner 9 | Toner particle 24 | Silica fine particle 8 | — | — | 38 | 4.6 |
| Comparative toner 10 | Toner particle 24 | Silica fine particle 9 | — | — | 47 | 2.5 |

In the table, the content of the resin A is the content (mass %) in the toner particle.

Evaluation of Toner

Toners 1 to 25 and Comparative toners 1 to 10 were evaluated in accordance with the methods below. A color laser printer (LBP-712Ci, by Canon Inc.) modified so that the process speed was 300 mm/sec was used in the evaluations. The toner contained in the cyan cartridge of the printer was removed, and the cartridge was filled with 150 g of each of Toner 18 and 25. Further, the toner contained in the black cartridge was removed, and the cartridge was filled with 150 g of each of Toners 1 to 17, 19 to 24 and Comparative toners 1 to 10. Thereafter, each cartridge above was attached to the printer station, and the following evaluations was performed.

Evaluation of Color Non-Uniformity

Under normal temperature and normal humidity (temperature 23° C., humidity 60% RH), there were formed 5 cm×5 cm solid images respectively having a 100% image area ratio of cyan toner and a 100% image area ratio of black toner, on coated paper (OS coated paper W, by Fuji Xerox Co., Ltd., basis weight 127 g/m$^2$), and 100 prints of each image were continuously outputted.

When using black Toners 1 to 17 and 19 to 24, and Comparative toners 1 to 10, the a*value and b*value (a*value and b*value in the CIE 1976 L*a*b*color system) of the 100th image were measured randomly at 30 points using a reflection spectrodensitometer (product name: Xrite-939, by X-Rite Inc.). A color difference ΔE at two points exhibiting measured values lying farthest apart from each other was worked out and used as an index of color non-uniformity. A color difference ΔE was calculated in accordance with the expression below, with $a^{*1}$ and $b^{*1}$ as the a*value and the b*value, respectively, of one of these two points, and $a^{*2}$ and $b^{*2}$ as the a*value and the b*value, respectively, of the other point.

$$\Delta E=((a^{*1}-a^{*2})^2+(b^{*1}-b^{*2})^2)^{0.5}$$

When using Toners 18 and 25, which are cyan toners, the L*value, a*value and b*value (L*value, a*value and b*value in the CIE 1976 L*a*b*color system) of the 100th image were measured randomly at 30 points using a reflection spectrodensitometer (product name: Xrite-939, by X-Rite Inc.). A color difference ΔE at two points exhibiting measured values lying farthest apart from each other was worked out and used as an index of color non-uniformity. A color difference ΔE was calculated in accordance with the expression below, with $L^{*1}$, $a^{*1}$ and $b^{*1}$ as the L*value, the a*value and the b*value, respectively, of one of these two points, and $L^{*2}$, $a^{*2}$ and $b^{*2}$ as the L*value, the a*value and the b*value, respectively, of the other point.

$$\Delta E=((L^{*1}-L^{*2})^2+(a^{*1}-a^{*2})^2+(b^{*1}-b^{*2})^2)^{0.5}$$

Each ΔE value above is good if it is 2.0 or less, more preferably 1.0 or less.

Evaluation of Fogging in a High-Temperature and High-Humidity Environment

In a high-temperature and high-humidity environment (temperature 30° C., humidity 80% RH), a printout test of 16,000 prints was carried out by repeating an intermittent operation of temporarily stopping the output, every two prints, of a horizontal line image having a print percentage of 0.2%. Once the test was over, the image was left to stand for 48 hours, and then a blank image was printed out again, whereupon the reflectance (%) of the non-image portion of the obtained image was measured using "REFLECTOMETER MODEL TC-6DS" (by Tokyo Denshoku Co., Ltd.). The obtained reflectance was evaluated in accordance with the criteria below by subtracting the obtained reflectance (%) from the reflectance (%) of unused printout paper (standard paper) having been measured in the same way. A smaller numerical value means a greater extent of suppression of image fogging and better chargeability. The evaluation was carried out using glossy paper (HP Brochure Paper 200 g, Glossy, by HP Inc., 200 g/m$^2$) in a glossy paper mode. A rating of C or higher was deemed as good.

Evaluation Criteria

A: less than 0.5%

B: from 0.5% to less than 1.5%

C: from 1.5% to less than 3.0%

D: 3.0% or above

Evaluation of Low-Temperature Fixability

The following evaluation was performed using Toners 1 to 25 and Comparative toners 1 to 10.

The evaluation was carried out in an environment at normal temperature and normal humidity (temperature 23° C., humidity 50% RH). The fixing medium used was FOX RIVER BOND paper (110 g/m$^2$). Through the use of the medium, which exhibits comparatively large surface unevenness, and is a heavy paper, blank dots described below are prone to occur, and thus low-temperature fixability can be evaluated stringently. With the fixing unit cooled down to room temperature (25° C.), there were continuously printed 100 solid black prints, and there was measured the average value of the number of blank dots in the solid black image in prints 95 to 100. As a result of continuous solid black printing, heat from the fixing unit is robbed by the medium and a state is brought about in which sufficient heat is not retained, resulting in a stringent evaluation of the low-temperature fixability of the toner. When the fixing performance of the toner is insufficient, a so-called blank-dot image is outputted in which unfixed toner comes out as a blank. The evaluation result is appraised through visual observation of the average number of blank dots occurring in the outputted image, using for instance a microscope that affords 10 or higher magnifications. The fewer the blank dots, the better is the low-temperature fixability of the toner denoted thereby. In the present evaluation, the fixing performance was evaluated on the basis of the temperature of the fixing unit for which the number of blank dots was less than 10. The lower this temperature, the better is the low-temperature fixability of the toner denoted thereby.

TABLE 6

| | Toner | Color non-uniformity ΔE | Fogging in high-temperature and high-humidity environment | Low-temperature fixing temperature (° C.) |
|---|---|---|---|---|
| Example 1 | Toner 1 | 0.5 | A(0.2) | 160 |
| Example 2 | Toner 2 | 1.7 | C(2.7) | 160 |
| Example 3 | Toner 3 | 1.5 | C(2.7) | 160 |
| Example 4 | Toner 4 | 1.8 | B(1.0) | 160 |
| Example 5 | Toner 5 | 1.7 | A(0.2) | 159 |
| Example 6 | Toner 6 | 0.5 | A(0.4) | 160 |
| Example 7 | Toner 7 | 0.7 | B(0.9) | 161 |
| Example 8 | Toner 8 | 1.4 | B(1.4) | 160 |
| Example 9 | Toner 9 | 1.8 | C(1.9) | 162 |
| Example 10 | Toner 10 | 1.4 | A(0.3) | 164 |
| Example 11 | Toner 11 | 0.8 | A(0.3) | 164 |

TABLE 6-continued

| | Toner | Color non-uniformity ΔE | Fogging in high-temperature and high-humidity environment | Low-temperature fixing temperature (° C.) |
|---|---|---|---|---|
| Example 12 | Toner 12 | 0.3 | A(0.4) | 162 |
| Example 13 | Toner 13 | 0.1 | A(0.4) | 162 |
| Example 14 | Toner 14 | 0.1 | A(0.4) | 160 |
| Example 15 | Toner 15 | 0.7 | A(0.3) | 160 |
| Example 16 | Toner 16 | 0.5 | A(0.3) | 160 |
| Example 17 | Toner 17 | 0.7 | A(0.4) | 162 |
| Example 18 | Toner 18 | 0.6 | A(0.3) | 167 |
| Example 19 | Toner 19 | 0.8 | A(0.4) | 164 |
| Example 20 | Toner 20 | 1.3 | B(1.4) | 164 |
| Example 21 | Toner 21 | 0.8 | A(0.4) | 169 |
| Example 22 | Toner 22 | 1.1 | A(0.4) | 164 |
| Example 23 | Toner 23 | 0.8 | C(1.9) | 152 |
| Example 24 | Toner 24 | 1.0 | C(2.8) | 150 |
| Example 25 | Toner 25 | 1.1 | A(0.4) | 160 |
| Comparative example 1 | Comparative toner 1 | 2.7 | A(0.3) | 160 |
| Comparative example 2 | Comparative toner 2 | 2.3 | D(3.1) | 160 |
| Comparative example 3 | Comparative toner 3 | 2.1 | D(3.0) | 160 |
| Comparative example 4 | Comparative toner 4 | 2.7 | B(0.8) | 160 |
| Comparative example 5 | Comparative toner 5 | 2.5 | B(0.9) | 160 |
| Comparative example 6 | Comparative toner 6 | 2.2 | B(1.1) | 160 |
| Comparative example 7 | Comparative toner 7 | 2.4 | B(1.3) | 160 |
| Comparative example 8 | Comparative toner 8 | 2.1 | D(3.0) | 160 |
| Comparative example 9 | Comparative toner 9 | 3.1 | B(0.8) | 160 |
| Comparative example 10 | Comparative toner 10 | 3.5 | B(0.6) | 160 |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-076275, filed Apr. 28, 2021, which is hereby incorporated by reference herein in its entirety.

What is claimed is:

1. A toner comprising a toner particle comprising a binder resin and a wax, and an inorganic fine particle on a surface of the toner particle, wherein the binder resin comprises a resin A;

taking SPa $(cal/cm^3)^{0.5}$ as an SP value of the resin A calculated in accordance with the Fedors method, and taking SPw $(cal/cm^3)^{0.5}$ as an SP value of the wax calculated in accordance with the Fedors method, the SPa and the SPw satisfy Expression (1) below:

$$2.50 \leq SPa - SPw \leq 4.50 \quad (1),$$

the inorganic fine particle comprises a silica fine particle whose surface has been treated with a silicone oil;

in a $^{29}Si$ solid-state NMR measurement of the silica fine particle, taking A as an integration value of a D unit worked out by taking an integration value of a Q unit in a CP/MAS measurement as 100, and taking B as an integration value of a D unit worked out by taking an integration value of a Q unit in a DD/MAS measurement as 100, the A and the B satisfy Expressions (2) and (3) below:

$$30 \leq B \leq 60 \quad (2)$$

$$4.0 \leq A/B \leq 6.0 \quad (3).$$

2. The toner according to claim 1, wherein the resin A is a polyester resin.

3. The toner according to claim 1, wherein a content of the resin A in the toner particle is 0.5 mass % or higher.

4. The toner according to claim 1, wherein the SPa satisfies Expression (4) below:

$$10.50 \leq SPa \leq 12.80 \quad (4).$$

5. The toner according to claim 1, wherein the SPw satisfies Expression (5) below:

$$7.90 \leq SPw \leq 9.60 \quad (5).$$

6. The toner according to claim 5, wherein the SPw satisfies Expression (6) below:

$$7.90 \leq SPw \leq 9.20 \quad (6).$$

7. The toner according to claim 1, wherein the inorganic fine particle comprises the silica fine particle, the silica fine particle is a surface-treated product in which a silica fine particle before surface treatment is treated on a surface with the silicone oil, and a treatment amount by the silicone oil is 15.0 to 40.0 parts by mass relative to 100 parts by mass of the silica fine particle before surface treatment.

8. The toner according to claim 1, wherein the resin A has a monomer unit represented by Formula (A) below:

(A)

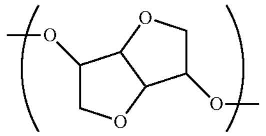

9. The toner according to claim 1, wherein the silicone oil comprises a modified silicone oil.

10. The toner according to claim 9, wherein the silicone oil further comprises a polydimethylsiloxane represented by Formula (D) below:

(D)

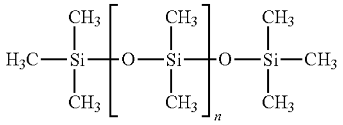

in the formula, n is an integer from 30 to 200.

11. The toner according to claim 1, wherein the silicone oil comprises a modified silicone oil represented by Formula (B) below:

(B)

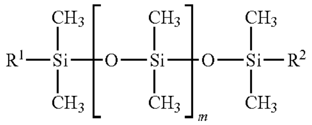

in the formula, $R^1$ is a carbinol group, a hydroxy group, an epoxy group, a carboxy group, an alkyl group or a hydrogen atom; $R^2$ is a carbinol group, a hydroxy group, an epoxy group, a carboxy group or a hydrogen atom; m is an integer from 30 to 200; and each alkyl group in a side chain of Formula (B) is optionally substituted with a carbinol group, a hydroxy group, an epoxy group, a carboxy group or a hydrogen atom.

12. The toner according to claim 11, wherein the modified silicone oil represented by Formula (B) is a modified silicone oil represented by Formula (C) below:

(C)

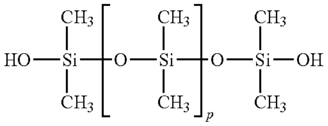

in the formula, p is an integer from 30 to 200.

13. The toner according to claim 1, wherein the inorganic fine particle comprises the silica fine particle;

the silica fine particle is a surface-treated product in which a silica fine particle before surface treatment is treated on a surface with the silicone oil; and a number-average particle diameter of a primary particle of the silica fine particle before surface treatment is 5 to 35 nm.

14. The toner according to claim 1, wherein a number-average particle diameter of a primary particle of the silica fine particle before surface treatment is 5 to 30 nm.

* * * * *